(12) United States Patent
Won et al.

(10) Patent No.: US 10,613,543 B2
(45) Date of Patent: Apr. 7, 2020

(54) ROBOT CLEANER SYSTEM HAVING CHARGING STATION

(71) Applicant: LG ELECTRONICS INC., Seoul (KR)

(72) Inventors: Woonghui Won, Seoul (KR); Anna Kim, Seoul (KR); Inbo Shim, Seoul (KR); Byungdoo Yim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 190 days.

(21) Appl. No.: 15/856,962

(22) Filed: Dec. 28, 2017

(65) Prior Publication Data

US 2018/0188737 A1 Jul. 5, 2018

(30) Foreign Application Priority Data

Dec. 30, 2016 (KR) .......................... 10-2016-0184418
Mar. 17, 2017 (KR) .......................... 10-2017-0034027

(51) Int. Cl.

| | |
|---|---|
| *B60L 53/37* | (2019.01) |
| *G05D 1/02* | (2020.01) |
| *A47L 9/28* | (2006.01) |
| *G05D 1/00* | (2006.01) |
| *B60L 53/36* | (2019.01) |
| *H02J 7/00* | (2006.01) |

(52) U.S. Cl.
CPC .......... *G05D 1/0234* (2013.01); *A47L 9/2805* (2013.01); *A47L 9/2826* (2013.01); *A47L 9/2852* (2013.01); *A47L 9/2894* (2013.01); *B60L 53/36* (2019.02); *B60L 53/37* (2019.02); *G05D 1/0088* (2013.01); *G05D 1/0225* (2013.01); *A47L 2201/022* (2013.01); *A47L 2201/04* (2013.01); *G05D 2201/0215* (2013.01); *H02J 7/0042* (2013.01)

(58) Field of Classification Search
CPC ....................................................... H02J 7/00
See application file for complete search history.

(56) References Cited

U.S. PATENT DOCUMENTS

| | | |
|---|---|---|
| 9,089,249 B2 | 7/2015 | Hung et al. |
| 2010/0324734 A1 | 12/2010 | Lee et al. |
| 2010/0324736 A1 | 12/2010 | Yoo et al. |

(Continued)

FOREIGN PATENT DOCUMENTS

| | | |
|---|---|---|
| EP | 2 449 938 | 5/2012 |
| EP | 2 672 356 | 12/2013 |

(Continued)

OTHER PUBLICATIONS

European Search Report dated Dec. 2, 2019 issued in EP Application No. 17889277.4.

*Primary Examiner* — Robert Grant
(74) *Attorney, Agent, or Firm* — Ked & Associates, LLP

(57) ABSTRACT

A robot cleaner (or autonomous cleaner) charging system includes a first light emitting device to output an optical signal for inducing a docking of the robot cleaner, a second light emitting device and a third light emitting device to output an optical signal for inducing a homing of the robot cleaner, and provided at left and right of the first light emitting device, respectively, and a light emitting device fixing member to set position and direction of the first, second and third light emitting devices.

19 Claims, 24 Drawing Sheets

(56) References Cited

U.S. PATENT DOCUMENTS

| | | | |
|---|---|---|---|
| 2012/0143428 A1* | 6/2012 | Kim | A47L 9/2831 |
| | | | 701/23 |
| 2013/0199570 A1 | 8/2013 | Lee et al. | |
| 2016/0352112 A1 | 12/2016 | Shudo | |

FOREIGN PATENT DOCUMENTS

| | | |
|---|---|---|
| JP | 2015-150275 | 8/2015 |
| KR | 10-2004-0053653 | 6/2004 |
| KR | 10-2006-0134368 | 12/2006 |
| KR | 10-1021267 | 3/2011 |
| KR | 10-1428846 | 8/2014 |
| KR | 10-1437778 | 9/2014 |
| KR | 10-1672787 | 11/2016 |

\* cited by examiner

ROBOT CLEANER SYSTEM HAVING CHARGING STATION

CROSS-REFERENCE TO RELATED APPLICATIONS

This application claims priority under 35 U.S.C. § 119 to Korean Application No. 10-2016-0184418, filed on Dec. 30, 2016, and Korean Application No. 10-2017-0034027, filed on Mar. 17, 2017, whose entire disclosures are hereby incorporated by reference.

BACKGROUND

1. Field

The present disclosure relates to a robot cleaner that performs a function of cleaning a floor while traveling by itself in a certain area, and a robot cleaner system that includes a charging station for autonomous charging of the robot cleaner.

2. Background

In general, robots have been developed for industrial purposes to play a role in factory automation. Recently, application fields of robots have extended, and robots for medical purpose, space navigation robots, etc., and even home robots available that may be used in general houses have been developed.

A representative example of home robots is a robot cleaner. The robot cleaner performs a function of cleaning a floor while traveling by itself in a certain area. For example, a household robot cleaner is configured to suck dust (including foreign substances) on a floor or mop the floor while autonomously traveling inside a house.

Such a robot cleaner generally includes a rechargeable battery and various sensors for avoiding an obstacle during traveling. Thus, the robot cleaner performs a cleaning function while traveling by itself. In order to allow the autonomous traveling of a robot cleaner to be smoothly performed, it is important to set the entire traveling route and sense obstacles on the traveling route. The robot cleaner may also perform a function of photographing or monitoring the inside of a house using autonomous traveling characteristics thereof. In order to perform the above-described functions, various sensors are used in the robot cleaner, but studies for an optimized design have not been satisfactory yet.

In order to consistently operate the robot cleaner, the charging of the battery is necessarily required. Especially, a robot cleaner having an autonomous travelling features should have the features of an automatic charging or an autonomous charging characteristics. The autonomous charging of the robot cleaner has many matters to be improved in various viewpoints. Firstly, it is required to provide a basis for correctly docking the robot cleaner that autonomously travels on a charging station.

Charging of the robot cleaner is performed by contacting a charging terminal of the robot cleaner to a charging terminal of the charging station, and such a process may be referred to as a docking. When an accurate docking is not made, an autonomous charging cannot be performed.

Since the autonomous travelling characteristics of the robot cleaner are incomplete yet, the robot cleaner system may include a virtual wall. The virtual wall is a device to transmit an access-restraint signal to the robot cleaner by pre-installing at an area where the robot cleaner should not access (for instance, stairs, a cliff, a region where a dangerous substance exists, etc.).

Conventionally, since the virtual wall is used only to prevent the robot cleaner from accessing, the utilization of the virtual wall has been limited. Further, the virtual wall is operated by a battery, and there are matters to be improved both in a case where the battery is a primary battery and a secondary battery. For instance, when the battery is a primary battery, it is pointed out that the battery should be consistently replaced. Also when the battery is a secondary battery, it is pointed out that a separate device for charging the battery has to be provided.

BRIEF DESCRIPTION OF THE DRAWINGS

The embodiments will be described in detail with reference to the following drawings in which like reference numerals refer to like elements wherein.

DETAILED DESCRIPTION

Description will now be given in detail of the exemplary embodiments, with reference to the accompanying drawings. For the sake of brief description with reference to the drawings, the same or equivalent components will be provided with the same reference numbers, and description thereof will not be repeated. Hereinafter, a robot cleaner according to an exemplary embodiment will be described in more detail with reference to the accompanying drawings.

Figure 1:
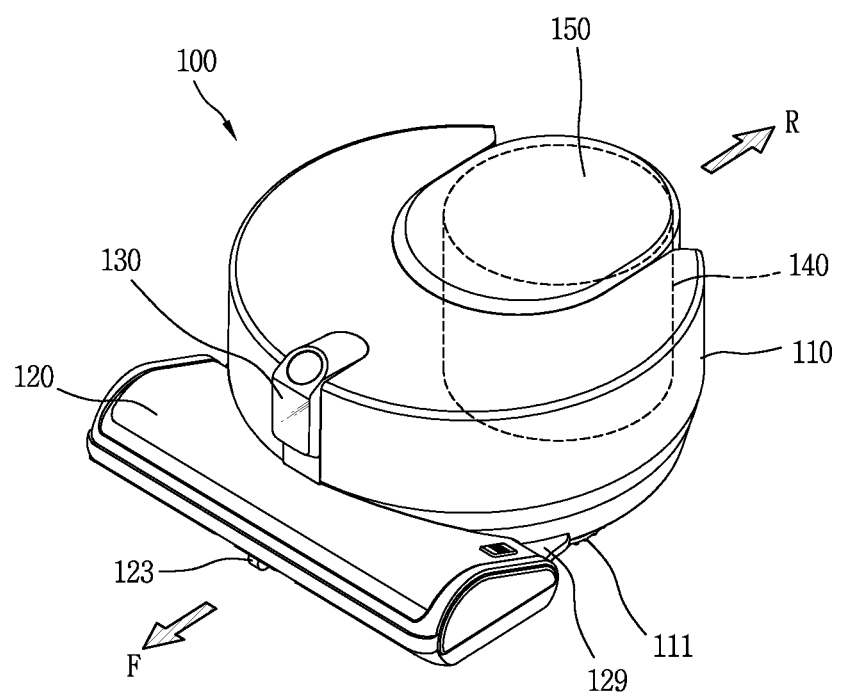
FIG. 1 is a perspective view illustrating an example of a robot cleaner according to an exemplary embodiment.
Figure 2:
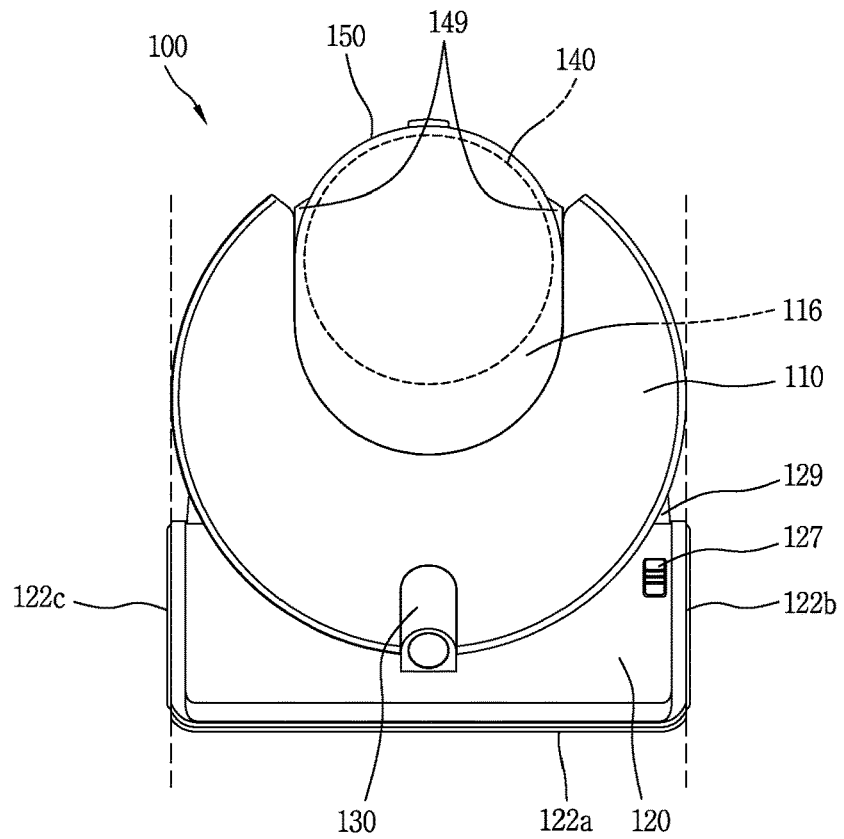
FIG. 2 is a plan view of the robot cleaner shown in FIG. 1.
Figure 3:
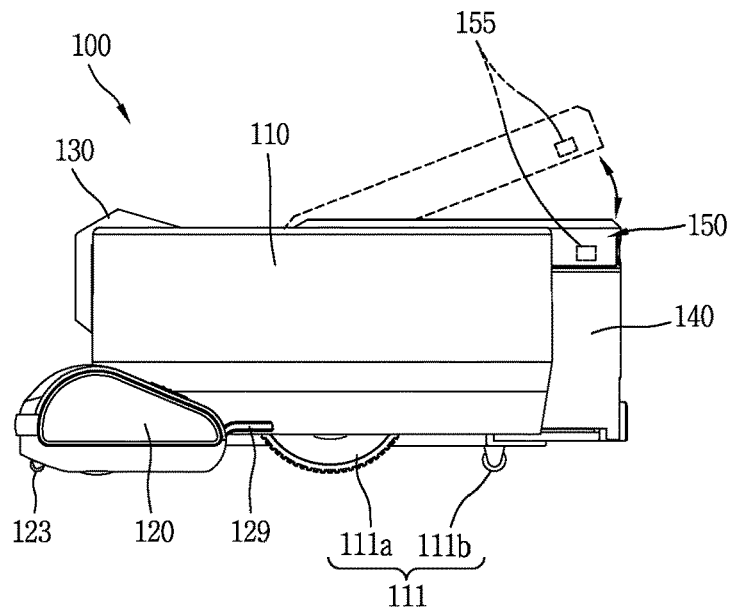
FIG. 3 is a side view of the robot cleaner shown in FIG. 1.

FIG. 1 is a perspective view illustrating an example of a robot cleaner (or autonomous cleaner) 100 according to an exemplary embodiment. FIG. 2 is a plan view of the robot cleaner 100 shown in FIG. 1. FIG. 3 is a side view of the robot cleaner 100 shown in FIG. 1. Referring to FIGS. 1 to 3, the robot cleaner 100 performs a function of cleaning a floor while traveling by itself in a certain area. Here, the cleaning of the floor includes sucking dust (including foreign substances) of the floor or mopping the floor.

The robot cleaner 100 includes a cleaner body 110, a suction unit (or cleaner head) 120, a sensing unit (or sensor) 130, and a dust container 140. The cleaner body 110 is provided with a controller (not shown) for controlling the robot cleaner 100 and a wheel unit 111 for allowing the robot cleaner 100 to travel. The robot cleaner 100 may be moved in all directions or be rotated by the wheel unit 111.

The wheel unit 111 includes a main wheel assembly 111a and a sub-wheel 111b. The main wheel assembly 111a is provided at both sides of the cleaner body 110, respectively, to be rotatable in one direction or the other direction according to a control signal of the controller. Each of the main wheel assembly 111a may be configured to be driven independently from each other. For example, each of the main wheel assembly 111a may be driven by different driving motors, respectively.

The sub-wheel 111b supports the cleaner body 110 together with the main wheel assembly 111a, and is configured to assist traveling of the robot cleaner 100 through the main wheel assembly 111a. The sub-wheel 111b may also be provided in the suction unit 120, which will be described later.

As described above, the controller controls the driving of the wheel unit 111, so that the robot cleaner 100 autonomously travels on the floor. Meanwhile, a battery (not shown) that supplies power to the robot cleaner 100 is mounted in the cleaner body 110. The battery is rechargeable, and may be configured to be attachable/detachable to/from a bottom surface of the cleaner body 110.

The suction unit 120 is provided in a shape protruding from one side of the cleaner body 110 to suck air containing dust. The one side may be a side at which the cleaner body 110 travels in a forward direction F, i.e., the front of the cleaner body 110.

In the drawings, it is illustrated that the suction unit 120 has a shape protruding frontward, leftward, and rightward at one side of the cleaner body 110. Specifically, a front end of the suction unit 120 is provided at a position spaced forward apart from the one side of the cleaner body 110, and both the left and right end portions of the suction unit 120 are provided at positions spaced leftward and rightward apart from the one side of the cleaner body 110, respectively.

As the cleaner body 110 is formed in a circular shape, and both sides of a rear end of the suction unit 120 are respectively formed to protrude leftward and rightward from the cleaner body 110, an empty space, i.e., a gap may be formed between the cleaner body 110 and the suction unit 120. The empty space is a space formed between both left and right ends of the cleaner body 110 and both left and right ends of the suction unit 120, and have a shape recessed inward of the robot cleaner 100.

When an obstacle is inserted into the empty space, there may be a problem that the robot cleaner 100 is caught by the obstacle and does not move. In order to prevent this problem, a cover member 129 may be provided to cover at least one portion of the empty space. The cover member 129 may be provided to the cleaner body 110 or the suction unit 120. In this exemplary embodiment, it is illustrated that the cover members 129 protrude from both sides of the rear end of the suction unit 120 to cover outer circumferential surfaces of the cleaner body 110, respectively.

The cover members 129 are provided to fill in the empty space, i.e., at least one portion of the empty space between the cleaner body 110 and the suction unit 120. In other words, the cover member 129 is provided to fill in at least one portion of space recessed inward between left and right outer circumferential surfaces of the cleaner body 110 formed in a curve and both left and right end portions of the suction unit 120 formed to protrude from the respective left and right outer circumferential surfaces. Thus, it is possible to implement a structure capable of preventing an obstacle from being caught in the empty pace or easily escaping from an obstacle even when the obstacle is caught in the empty space.

The cover member 129 formed to protrude from the suction unit 120 may be supported by the outer circumferential surface of the cleaner body 110. When the cover member 129 is formed to protrude from the cleaner body 110, the cover member 129 may be supported by a rear surface portion of the suction unit 120. According to the above-described structure, when the suction unit 120 collides with an obstacle and receives an impact from the obstacle, part of the impact is transferred to the cleaner body 110, so that the impact can be dispersed.

The suction unit 120 may be detachably coupled to the cleaner body 110. When the suction unit 120 is separated from the cleaner body 110, a mop module (not shown) may be detachably coupled to the cleaner body 110, in replacement of the separated suction unit 120. Therefore, when a user intends to remove dust of a floor, the user may mount the suction unit 120 to the cleaner body 110. When the user intends to clean the floor, the user may mount the mop module to the cleaner body 110.

When the suction unit 120 is mounted to the cleaner body 110, the mounting may be guided by the cover members 129. That is, the cover members 129 are provided to cover the outer circumferential surface of the cleaner body 110, so that the relative position of the suction unit 120 with respect to the cleaner body 110 can be determined.

The sensing unit 130 is provided at the cleaner body 110. As shown in the drawings, the sensing unit 130 may be provided at one side of the cleaner body 110, at which the suction unit 120 is located, i.e., the front of the cleaner body 110. The sensing unit 130 may be formed to protrude from top and side surfaces of the cleaner body 110, and an upper end 134$b$1 of the sensing unit 130 is formed at a position protruding upward from the top surface of the cleaner body 110.

The sensing unit 130 may be provided to overlap with the suction unit 120 in the top-bottom direction of the cleaner body 110. The sensing unit 130 is provided above the suction unit 120, to sense an obstacle or geographic feature at the front thereof such that the suction unit 120 located foremost of the robot cleaner 100 does not collide with the obstacle or geographic feature. The sensing unit 130 is configured to additionally perform another sensing function besides such a sensing function. This will be described in detail later.

A dust container accommodation part 113 is provided in the cleaner body 110, and the dust container 140 that separates and collects dust in sucked air is detachably coupled to the dust container accommodation part 113. As shown in the drawings, the dust container accommodation part 113 may be formed at the other side of the cleaner body 110, i.e., the rear of the cleaner body 110. The dust container accommodation part 113 has a shape opened rearward of the cleaner body 110. The dust container accommodation part 113 may be formed in a shape dented toward rear and front sides of the cleaner body 110.

Part of the dust container 140 is accommodated in the dust container accommodation part 113. In this case, the other part of the dust container 140 may be formed to protrude toward the rear of the cleaner body 110 (i.e., in a reverse direction R opposite to the forward direction F). A dust cover 150 may be hingedly connected to the cleaner body 110 to be provided over the dust container 140, and one or more tabs 155 may be positioned on the dust cover 150 or dust container 140 to hold the dust cover 150 on the dust container 140.

An entrance through which air containing dust is introduced and an exit through which air having dust separated therefrom is discharged are formed in the dust container 140. When the dust container 140 is mounted in the dust container accommodation part 113, the entrance and the exit are configured to respectively communicate with a first opening and a second opening, which are formed in an inner wall of the dust container accommodation part 113.

An inhalation flow path in the cleaner body 110 corresponds to a flow path from an introduction port (not shown) communicating with a communication part 120$b$" to the first opening 110$a$, and an exhaust flow path in the cleaner body 110 corresponds to a flow path from the second opening 110$b$ to an exhaust port 112.

According to such a connection relationship, air containing dust, which is introduced through the suction unit 120, is introduced into the dust container 140 via the inhalation flow path in the cleaner body 110, and the air and the dust are separated from each other by passing through a filter or a cyclone provided in the dust container 140. The dust is collected in the dust container 140, and the air is discharged from the dust container 140 and then finally discharged to the outside through the exhaust port 112 by passing through the exhaust flow path in the cleaner body 110.

Figure 4:
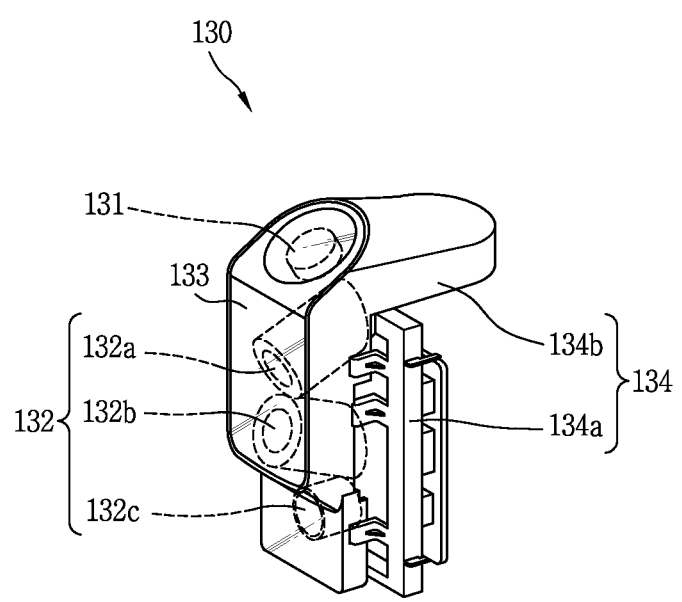
FIG. 4 is a view illustrating a sensing unit, which is separated from the robot cleaner shown in FIG. 1.
Figure 5:
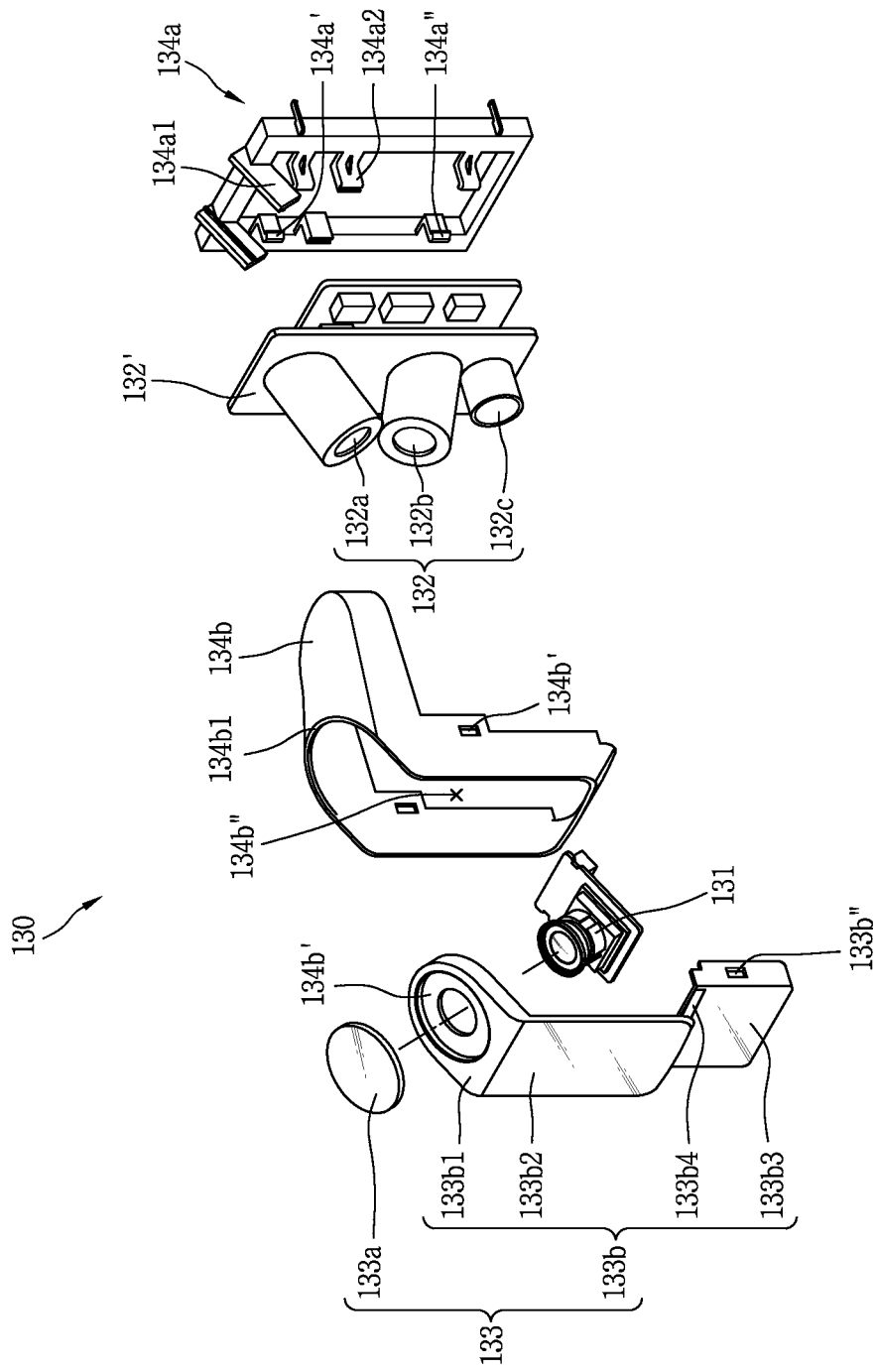
FIG. 5 is an exploded perspective view of the sensing unit shown in FIG. 4.
Figure 6:
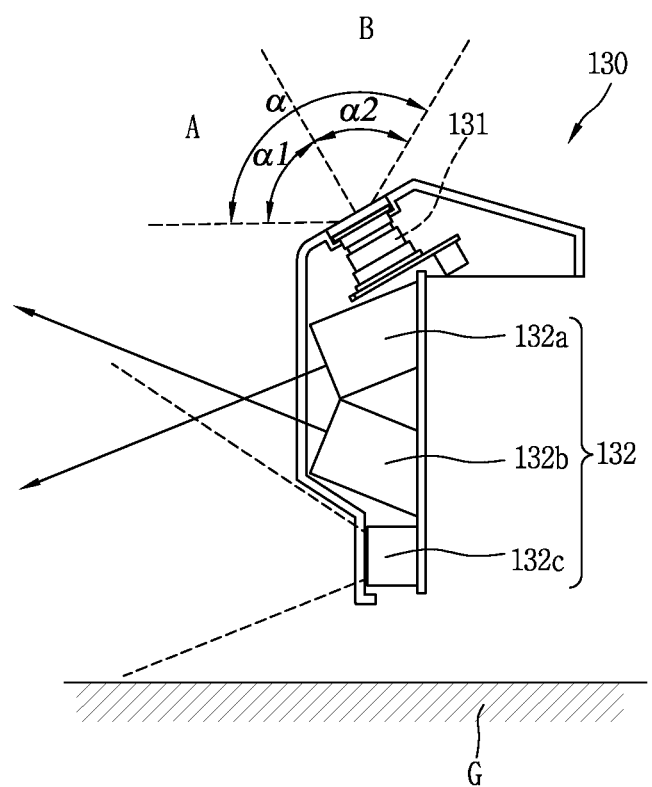
FIG. 6 is a view conceptually illustrating a section of the sensing unit shown in FIG. 4.

Hereinafter, the sensing unit 130 will be described in more detail. FIG. 4 is a view illustrating the sensing unit 130 which is separated from the robot cleaner 100 shown in FIG. 1, FIG. 5 is an exploded perspective view of the sensing unit 130 shown in FIG. 4, and FIG. 6 is a view conceptually illustrating a section of the sensing unit 130 shown in FIG. 4. For reference, in FIG. 6, some components are excluded or briefly illustrated for convenience of description.

Referring to FIGS. 4 to 6, the sensing unit 130 includes a first sensing part 131 and a second sensing part 132. The first sensing part 131 is provided to be inclined with respect to one surface of the cleaner body 110 to simultaneously photograph front and upper parts of the cleaner body 110. A camera may be used as the first sensing part 131. Here, the one surface of the cleaner body 110 may become a floor surface as a surface parallel to the floor, or the top or side surface of the cleaner body 110, and the first sensing part 131 may be provided to be inclined at 30 degrees with respect to the top surface of the cleaner body 110.

The first sensing part 131 may be located at an upper corner portion at which the top and side surfaces of the cleaner body 100 meet each other. In the drawings, it is illustrated that the first sensing part 131 is provided at a middle upper corner portion of the cleaner body 110 to be inclined with respect to each of the top and side surfaces of the cleaner body 110.

As the first sensing part 131 is provided to be inclined within a range of acute angles with respect to the one surface of the cleaner body 110, the first sensing part 131 is configured to simultaneously photograph the front and upper parts of the cleaner body 110.

Figure 7:
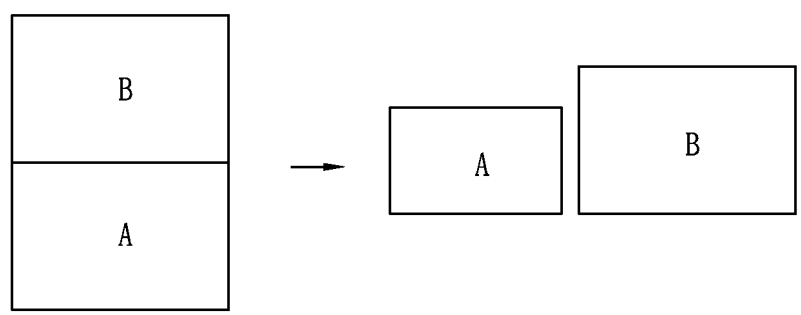
FIG. 7 is a view illustrating separation of an image photographed by a first sensing part shown in FIG. 6.

FIG. 7 illustrates a concept that an image photographed by the first sensing part 131 is divided into a front image A and an upper image B. Referring to FIG. 7, the front image A and the upper image B, which are photographed by the first sensing part 131, may be divided based on an angle $\alpha$ of view in the top-bottom direction (i.e., the vertical direction) of the first sensing part 131. That is, an image corresponding to part $\alpha$1 of the angle $\alpha$ of view in the photographed image A+B may be recognized as the front image A, and an image corresponding to the other part $\alpha$2 of the angle $\alpha$ of view in the photographed image A+B may be recognized as the upper image B.

The front image A photographed by the first sensing part 131 is used to monitor the front in real time. For example, when the robot cleaner 100 is used for household purposes, the front image A photographed by the first sensing part 131 may be used to monitor a trespass into an empty house or to provide an image of the inside of the house to an electronic device (e.g., a mobile terminal possessed by the user) through a remote connection.

When the front image A photographed by the first sensing part 131 is used to monitor a trespass into the empty house, the following control may be performed. The controller may compare front images A photographed by the first sensing part 131 at a preset time interval. When the front images A are different from each other, the controller may generate a control signal. The control may be performed in a state in which the cleaner body 110 is stopped. The control signal may be an alarm sound output signal or a transmission signal that provides a notification, a photographed front image A, and the like to the electronic device through the remote connection.

When the front image A photographed by the first sensing part 131 is used to provide an image of the inside of the house to the electronic device, the following control may be performed. If an image request signal is received from the electronic device through the remote connection, the controller may separate a front image A from an image photographed by the first sensing part 131 and transmit the front image A to the electronic device. The controller may be configured to move to a specific position by controlling driving of the wheel unit 111 and then transmit the front image A at the corresponding position to the electronic device.

The upper image B photographed by the first sensing part 131 is used to generate a map of a traveling area and sense a current position in the traveling area. For example, when the robot cleaner 100 is used for household purposes, the controller may generate a map of a traveling area, using a boundary between a ceiling and a side surface in the upper image B photographed by the first sensing part 131, and sense a current position in the traveling area, based on main feature points of the upper image B. The controller may use not only the upper image B but also the front image A together with the upper image B so as to generate a map of a traveling area and sense a current position in the traveling area.

The second sensing part 132 is provided in a direction intersecting the first sensing part 131 to sense an obstacle or geographic feature located at the front thereof. In the drawings, it is illustrated that the second sensing part 132 is provided long in the top-bottom direction at the side surface of the cleaner body 110.

The second sensing part 132 includes a first laser 132a, a second laser 132b, and a camera 132c. The first laser 132a is configured to irradiate a laser toward a front lower side of the robot cleaner 100, and the second laser 132b is configured to irradiate a laser toward a front upper side of the robot cleaner 100. The first laser 132a and the second laser 132b may be provided in a line in the top-bottom direction. In the drawings, it is illustrated that the second laser 132b is provided under the first laser 132a.

The camera 132c is configured to photograph, in a preset photographing area, the laser irradiated by the first laser 132a and the second laser 132b. The preset photographing area includes an area from the floor to an upper end of the robot cleaner 100. Thus, the robot cleaner 100 can sense an obstacle at the front thereof, and it is possible to prevent the robot cleaner 100 from colliding with or being inserted into an obstacle at an upper portion thereof.

The preset photographing area may be, for example, an area within an angle of view of 105 degrees in the top-bottom direction, an angle of view of 135 degrees in the left-right direction, and the front within 25 m. The preset photographing area may be changed depending on various factors such as installation positions of the first and second lasers 132a and 132b, irradiation angles of the first and second lasers 132a and 132b, and a height of the robot cleaner 100.

The first laser 132a, the second laser 132a, and the camera 132c may be provided in a line in the top-bottom direction of the cleaner body 110. In the drawings, it is illustrated that the camera 132c is provided under the second laser 132b. The first laser 132a is provided to be downwardly inclined with respect to the side surface of the cleaner body 110, and the second laser 132b is provided to be upwardly inclined with respect to the side surface of the cleaner body 110.

Figure 8:
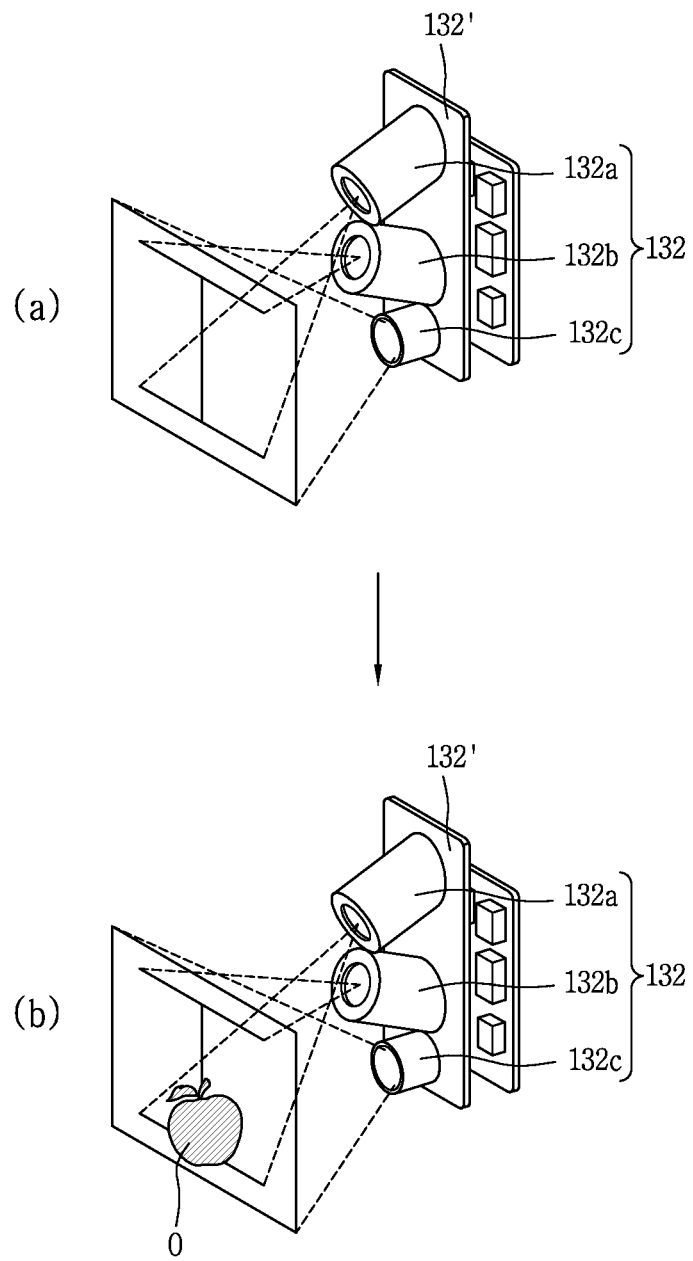
FIG. 8 is a view illustrating a concept that an obstacle is sensed by a second sensing part shown in FIG. 4.

FIG. 8 illustrates a concept that an obstacle is sensed by the second sensing part 132 shown in FIG. 4. First, referring to section (a) of FIG. 8, the first laser 132a and the second laser 132b are configured to respectively irradiate lasers having a shape extending at least one direction. In the drawing, it is exemplary illustrated that the first laser 132a irradiates lasers intersecting each other and the second laser 132b irradiates a single laser. Accordingly, a bottommost laser is used to sense an obstacle at a bottom portion, a topmost laser is used to sense an obstacle at a top portion, and a middle laser between the bottommost laser and the topmost laser is used to sense an obstacle at a middle portion.

For example, as shown in section (b) of FIG. 8, when an obstacle O is located at the front, the bottommost laser and a portion of the middle laser may be interrupted or distorted by the obstacle O. When such interruption or distortion is sensed, the camera 132c transmits an obstacle sensing signal to the controller.

The controller is configured to determine that an obstacle O is located at the front when the obstacle sensing signal is received, and to control the driving of the wheel unit 111. For example, the controller may apply a driving force in the opposite direction to the main wheels 111a such that the robot cleaner 100 moves rearward. Alternatively, the controller may apply the driving force to only any one of the main wheels 111a such that the robot cleaner 100 rotates, or apply the driving force to both the main wheels 111a in different directions from each other.

Hereinafter, the specific structure of the sensing unit 130 will be described. Referring to FIG. 5, the sensing unit 130 further includes a window part 133 and a case 134 in addition to the first sensing part 131 and the second sensing part 132.

The window part 133 is provided to cover the first and second sensing parts 131 and 132, and has a transparency. Here, the transparency may mean the properties that at least part of incident light is transmitted, and may have a concept to include the meaning of translucence.

The window part 133 may be formed of a synthetic resin material or a glass material. When the window part 133 is formed to be translucent, the material may be translucent, or the material has the translucence itself, but a film attached to the material may be translucent.

The case 134 is mounted to the cleaner body 110 and configured to fix the first and second sensing parts 131 and 132 and the window part 133. As shown, the case 134 is configured to accommodate therein at least part of the window part 133. The case 134 may be formed of a synthetic resin material or metallic material, and has the property of non-transparency.

As shown, the case 134 may include a mounting frame 134a and a cover frame 134b. The mounting frame 134a provides a space for mounting and supporting the first and second sensing parts 131 and 132. To this end, the mounting frame 134a may provide a first mounting part 134a1 for mounting the first sensing unit 131 and a second mounting part 134a2 for mounting the second sensing unit 132, respectively. A substrate 132' to which the first and second lasers 132a and 132b and the camera 132c are mounted may be mounted to the second mounting part 134a2. The second mounting part 134a2 may be mounted to be inclined with respect to the first mounting part 134a1.

The mounting frame 134a is provided with first and second coupling hooks 134a' and 134a" for coupling with the cover frame 134b and the window part 133. respectively. The first coupling hook 134a' is coupled to a coupling hole 133' of the cover frame 134b and the second coupling hook 134a" is coupled to the coupling hole 133b" of the window part 133. The mounting frame 134a may be coupled to the cleaner body 110.

The cover frame 134*b* is coupled to the mounting frame 134*a*, and mounted to the cleaner body 110 with at least part of the window part 133 accommodated therein. The cover frame 134*b* is formed in an 'L'-shaped, and may be provided to cover top and side surfaces of the cleaner body 110 at a corner thereof.

An upper end 134*b*1 of the cover frame 134*b* is located at an upper side of the first sensing part 131, and may be formed to be inclined in the front and rear directions in a sharp shape. According to such a configuration, even though the robot cleaner is caught between furniture or in a gap while travelling, the robot cleaner can easily escape therefrom, and the first and second sensing parts 131 and 132 can be protected by the upper end 134*b*1 which is located at an upper side of the first and second sensing parts 131 and 132. In the drawings, it is illustrated that the upper end 134*b*1 is formed at an end of a hole 134" which will be described later.

In the hole 134" formed within the cover frame 134*b*, at least parts of the first and second sensing parts 131 and 132 may be accommodated. In the drawing, it is illustrated that the first sensing part 131, and the first and second lasers 132*a* and 132*b* are accommodated in the hole 134".

The window part 133 may include a first window part 133*a* and a second window part 133*b*. The first window part 133*a* is formed of a transparent material and provided to cover the first sensing part 131. The second window 133*b* is formed of a translucent material and provided to cover the second sensing part 132. As shown, a through hole 133*b*' may be formed at a portion of the second window 133*b* corresponding to first sensing part 131, and the first window 133*a* may be provided to cover the through hole 133*b*'.

As the first window 133*a* is formed of a transparent material, front and top images may be clearly photographed. Further, as the second window 133*b* has the translucence, the first and second lasers 132*a* and 132*b* and the camera 132*c* on the second window 133*b* are not clearly shown from outside by naked eyes, so that a neat appearance may be implemented.

The second window 133*b* may be divided by a first part 133*b*1, a second part 133*b*2, an extension part 133*b*4, and a third part 133*b*3. The first part 133*b*1 is a part where the through hole 133*b*' is formed, and provided to be inclined with respect to an upper surface of the cleaner body 110. The first window 133*a* mounted to the through hole 133*b*' is provided to cover the first sensing part 131.

The second part 133*b*2 is extended from the first part 133*b*1 in an inclined form, and provided to cover the first and second lasers 132*a* and 132*b*. In this embodiment, it is illustrated that the second part 133*b* is downwardly extended in parallel with a side surface of the cleaner body 110.

The extension part 133*b*4 is downwardly extended from the second part 133*b*2, and covered by the cover frame 134*b*. As shown, the extension part 133*b*4 may be downwardly extended toward an inner side from the second part 133*b*2. In other words, the extension part 133*b*4 may be provided to be inclined with respect to the third part 133*b*3 so as not to make an interference with an angle of view in the top-bottom direction of the camera 132*c*. Likewise, the portion of the cover frame 134*b* which covers the extension part 133*b*4 is provided to be inclined so as not to be interfered with the angle of view in the top-bottom direction.

The third part 133*b*3 is downwardly extended from the extension part 133*b*4 to protrude toward outside of the cover frame 134*b*, and provided to cover the camera 132*c*. The third part 133*b*3 may be downwardly extended along a side of the cleaner body 110 in parallel with the second part 133*b*2.

Figure 9:
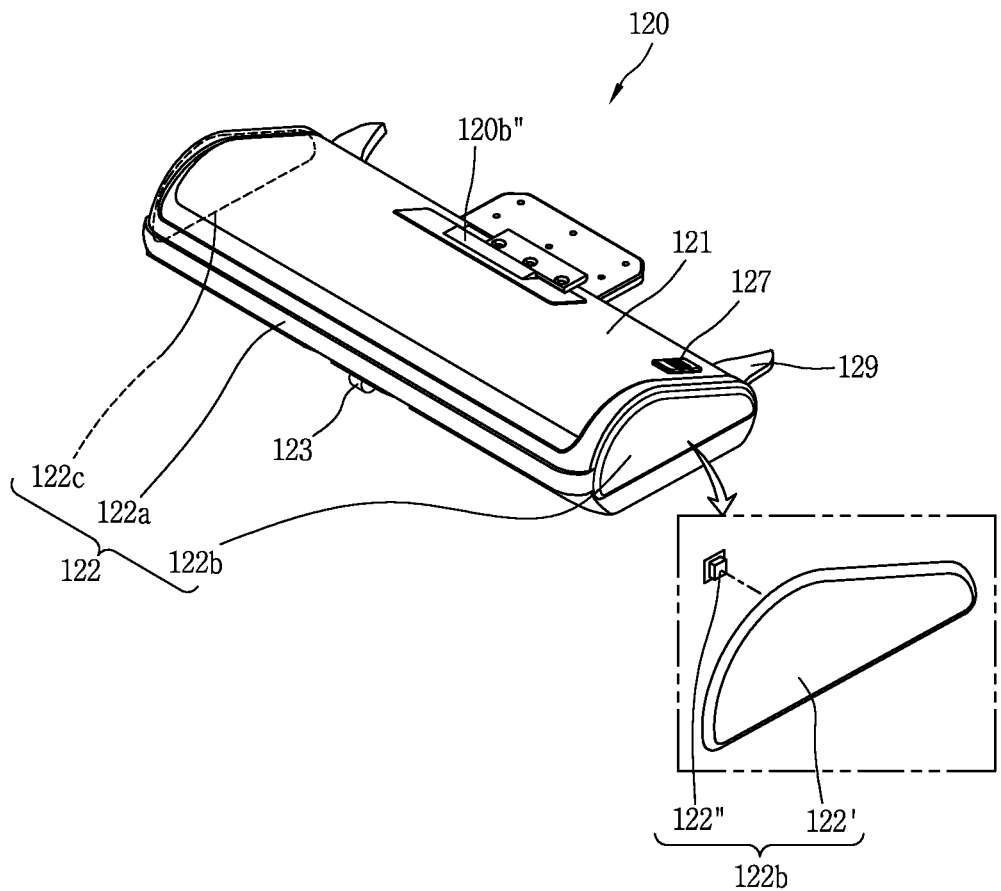
FIG. 9 is a view illustrating a suction unit, which is separated from the robot cleaner shown in FIG. 1.
Figure 10:
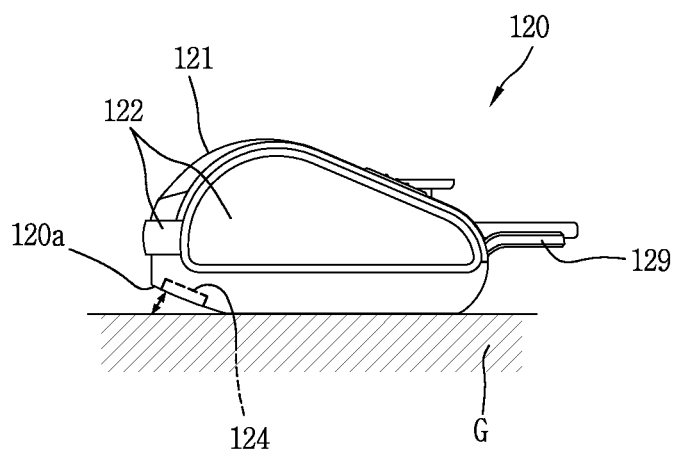
FIG. 10 is a side view of the suction unit shown in FIG. 9.
Figure 11:
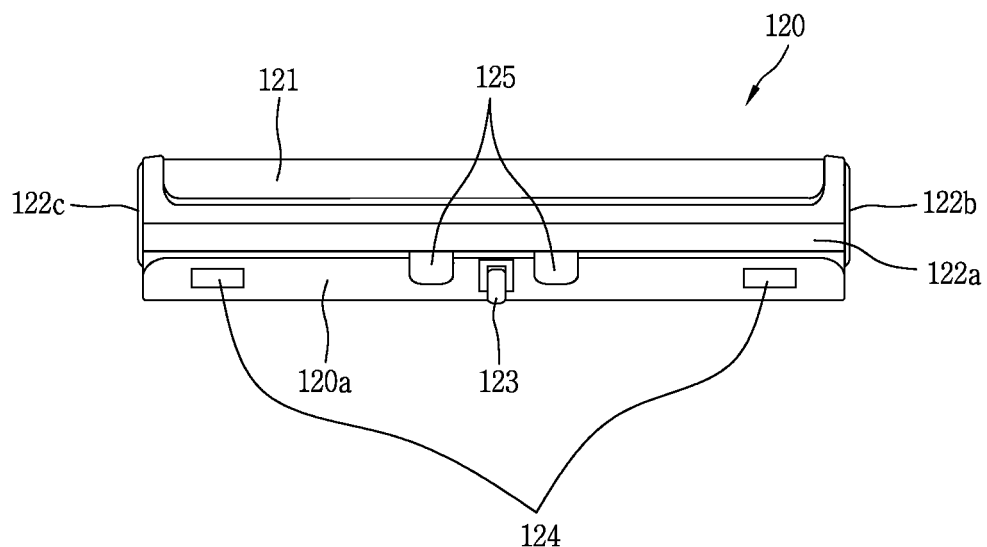
FIG. 11 is a front view of the suction unit shown in FIG. 9.
Figure 12:
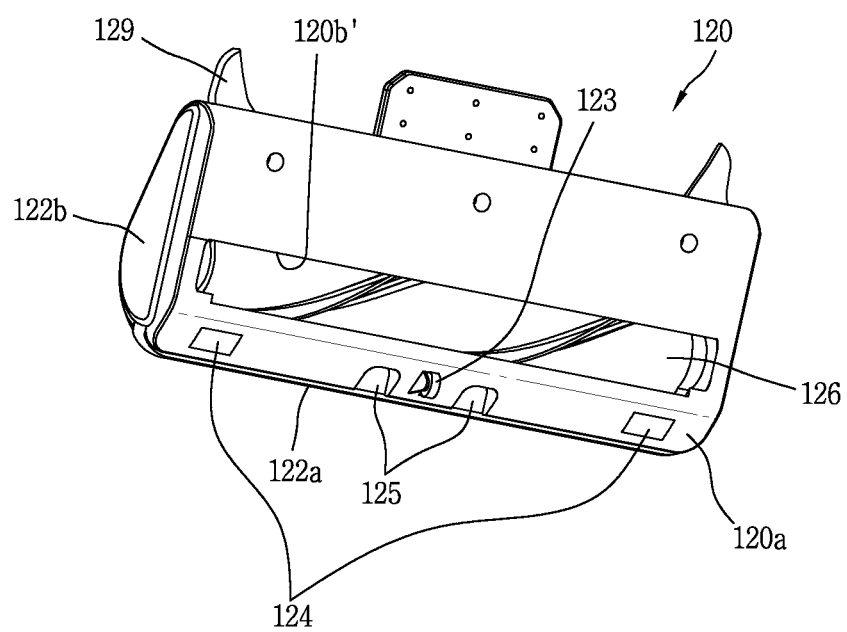
FIG. 12 is a view illustrating a bottom of the suction unit shown in FIG. 9.

Hereinafter, the suction unit 120 will be described in more detail. FIG. 9 is a view illustrating a suction unit 120, which is separated from the robot cleaner 100 shown in FIG. 1, FIG. 10 is a side view of the suction unit 120 shown in FIG. 9, FIG. 11 is a front view of the suction unit 120 shown in FIG. 9, and FIG. 12 is a view illustrating a bottom of the suction unit 120 shown in FIG. 9.

When the suction unit 120 has the shape protruded from the cleaner body 110, as in this embodiment, the possibility of colliding with an obstacle may rise as far as the suction unit 120 is not provided with a separate sensing unit 130. Even though the sensing unit 130 provided in the cleaner body 110 senses an obstacle in front of the cleaner body 110, a physical collision between the cleaner 100 and the obstacle may occur when the obstacle exists at a blind spot where the sensing unit 130 can not sense. When such a physical collision occurs, an avoidance of the obstacle should be made by going back or changing a direction, and to this end, sensing of the physical collision is first required.

The suction unit 120 includes a case 121 and a bumper switch 122 for sensing the physical collision. The case 121 forms an external appearance of the suction unit 120, and includes an introduction port 120*b*' for sucking air containing dust and a communication part 120*b*" communicating with an inhalation flow path within the cleaner body 110. At least part of the case 121 may be formed of a transparent material so that inside of the case 121 may be seen therethrough.

A bumper switch 122 is provided on at least one surface of the case 121. The bumper switch 122 is configured to transmit a contact signal to the controller by being pressed when contacting an obstacle. The bumper switch 122 may be provided to cover the case 121. In the drawings, it is illustrated that a front bumper switch 122*a* is provided in front of the case 121, and side bumper switches 122*b* and 122*c* are provided at both sides of the case 121, respectively.

According to the above configuration, it is possible to sense not only a collision with an obstacle located in front of the suction unit 120, but a collision with an obstacle located at both sides of the suction unit 120. Thus, it is possible to enlarge the sensing range of the physical collision with an obstacle.

Referring to preceding FIG. 2, it may be possible to note that the side bumper switches 122*b* and 122*c* are provided to protrude more than a virtual extension line which is in contact with both sides of the cleaner body 110. That is, the side bumper switches 122*b* and 122*c* may be provided to protrude more than both sides of the cleaner body 110 in a lateral direction.

In this instance, when an obstacle is located at a side surface of the robot cleaner 100, the side bumper switches 122*b* and 122*c* collide with the obstacle beforehand the cleaner body 110, so that the sensing may be effectively performed with respect to the obstacle.

The bumper switch 122 includes a bumper 122' and a switch 122". The bumper 122', a portion that is exposed to outside, is mounted to the case 1211 and configured to be inwardly movable by being pressed when contacting with an obstacle.

An elastic member (not shown) may be provided within the bumper 122" to outwardly apply a pressure to the bumper 122' so that the bumper 122' may be restored into its original state when the bumper 122' is separated from an obstacle. The elastic member may be supported by the bumper 122' and the case 121, respectively.

The switch 122" is provided within the bumper 122' and configured to generate an electric signal by being pressed when the bumper 122' is inwardly moved. A well-known micro-switch may be used as the switch 122".

When a contact signal with an obstacle is transmitted through the bumper switch 122, the controller is configured to control the wheel unit 111 by determining that the cleaner collides with an obstacle. For instance, the controller may apply a driving force in an opposite direction to the main wheel assembly 111a so that the robot cleaner 100 may go back. Alternatively, the controller may apply a driving force only to any one main wheel assembly 111a so that the robot cleaner 100 may rotate, or apply a driving force in different directions from each other to both the main wheel assemblies 111a.

In the above, it is described that the bumper switch 122 is configured to be divided into a front bumper switch 122a and side bumper switches 122b and 122c, but not limited thereto. The bumper switch 122 may be configured to be formed in a "⊏" shape to cover the front and both side surfaces of the case 121.

In this instance, the bumper switch 122 is configured to be movable to the rear (when the portion provided at the front surface of the case 121 contacts an obstacle), the right (when the portion provided at the left surface of the case 121 contacts an obstacle), and the left (when the portion provided at the right surface of the case 121 contacts an obstacle).

When the bumper switch 122, which is mechanically operated to the suction unit 120, is provided, there are advantages in that it is possible to more directly sense the collision with an obstacle, to reduce the manufacturing cost and to simplify the circuit configuration, compared to when an electronic sensor (for instance, an accelerometer, a PSD sensor, etc.) is provided. Further, a more improved sensing of obstacle can be performed by combination of the bumper switch 122 and the sensing unit 130 provided in the cleaner body 110 as described above, and thereby implementing an enhanced direction change function.

Meanwhile, when the robot cleaner 100 is located in the vicinity of a stairs which abruptly falls down or a cliff, while travelling in a normal direction F, an appropriate avoiding movement is required. If sensing of such a situation and a control responsive thereto are not executed, the robot cleaner is dropped down the stairs, resulting in a breakdown or failure to climb the stairs again.

To this end, a cliff sensor 124 is provided at a bottom front end of the suction unit 120, to sense a landform of a lower side. The cliff sensor 124 includes a light emitting part and a light receiving part, and is configured to measure a distance between the cliff sensor 124 and a floor G by calculating the time that the light irradiated by the light emitting part is received by the light receiving part. Accordingly, when a stairs which abruptly falls down is located in front, the received time is abruptly increased. When a cliff is located in front, light is not received to the light receiving part.

In the drawing, it is illustrated that a slant part 120a, which is upwardly slanted with respect to the floor G, is formed at a bottom front end of the suction unit 120, and a cliff sensor 124 is installed to the slant part 120a toward the floor G. According to the above configuration, the cliff sensor 124 is provided to be slanted toward the floor G at the front lower side. Accordingly, it is possible to sense the landform of the front lower side of the suction unit 120 by the cliff sensor 124.

Unlike the above disposition, the cliff sensor 124 may be configured such that it is provided vertically to the floor G to sense the landform right under the cliff sensor 124. When it is sensed that the landform at the lower part is lowered more than a certain level by the cliff sensor 124, the controller is configured to control driving of the wheel unit 111. For instance, the controller may apply a driving force in a reverse direction to the main wheel assembly 111a such that the robot cleaner 100 goes back in a reverse direction R. Alternatively, the controller may apply a driving force only to any one main wheel assembly 111a so that the robot cleaner 100 may rotate, or apply a driving force in different directions from each other to both the main wheel assemblies 111a.

The above described cliff sensor 124 may also be provided at a bottom surface of the cleaner body 110. Considering the function of the cliff sensor 124, it is preferred to dispose the cliff sensor 124 in the vicinity of a rear side of the cleaner body 110.

For reference, as the slanted portion 120a is formed at a bottom side front end of the suction unit 120, it is possible to easily climb a low doorsill or an obstacle. Further, as shown, when a supplement wheel 123 is provided to the slanted portion 120a, such a climbing can be more easily performed. For reference, the supplement wheel 123 is omitted to explain the cliff sensor 124 in FIG. 10.

Meanwhile, since the robot cleaner 100 is wirelessly driven, charging of a battery provided in the cleaner body 110 is required. To charge the battery, a charging station (not shown) is provided as a power supply, and the suction unit 120 is provided with a charging terminal 125 which is configured to be connectable to the charging station.

In the drawing, it is illustrated that the charging terminal 125 is provided at the slanted portion 120a of the case 121 and exposed to the front. The charging terminal 125 may be provided between the cliff sensors 124 which are provided at both sides of the suction unit 120, respectively.

Meanwhile, a brush roller 126 may be provided to the suction unit 120 to effectively suck dust. The brush roller 126 is ratably installed to the suction port 120', and configured to introduce dust into the suction unit 120 by sweeping the dust on the floor.

In view of the function of the brush roller 126, as the use time has passed, dust may gathered to the brush roller 126. Though there has been needs to clean the brush roller 126, it has a structure that is substantially difficult to be disassembled, thus making it difficult to clean the brush roller 126. In the present disclosure, a structure that can be cleaned by separately disconnecting only the brush roller 126 is proposed, without disassembling the suction unit 120 on the whole.

Figure 13:
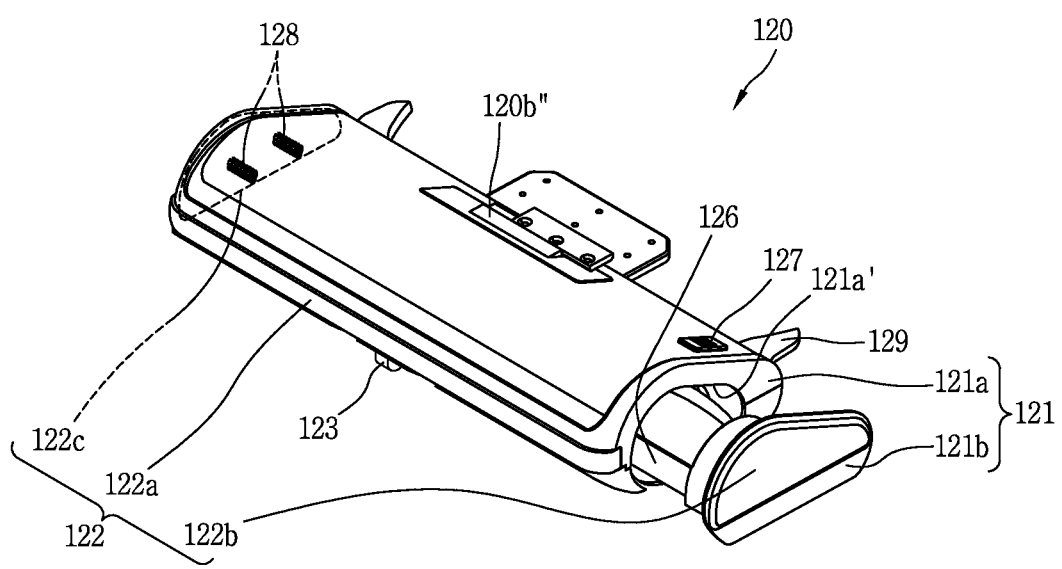
FIG. 13 is a view for explaining the concept that a brush roller is protruded by an operation of a manipulation unit in the suction unit shown in FIG. 9.

FIG. 13 is a view for explaining the concept that a brush roller 126 is protruded by an operation of a manipulation unit 127 in the suction unit 120 shown in FIG. 9. Referring to FIG. 13, the case includes a main case part 121a and a cover case part 121b.

The main case part 121a includes therein a brush roller 126 which is configured to be rotatable, and has an opening 121a' at one side thereof. A front bumper switch 122a is mounted at a front side of the main case part 121a, and side bumper switches 122b and 122c are mounted at another side of the main case part 121a.

The cover case part 121b is detachably coupled to the main case part 121a to open and or close the opening 121a' provided at one side of the main cover part 121a. One of the side bumper switches 122b and 122c is mounted to the cover case part 121b.

According to the above configuration, when the cover case part 122b is separated from the main cover part 121a, the opening 121a' provided at one side of the main cover part 121a is opened to the outside. Thus, it is possible to draw out the brush roller 126 provided within the main case part 121a through the opening 121a'.

The manipulation part 127 through which locking of the cover case part 121b is released from the main case part 121a may be provided in the suction unit 120. The manipulation part 127 may be provided at the main cover part 121a or the cover case part 121b. The manipulation part 127 may be implemented in various types such as a slide type and a press type. In this figure, it is illustrated that the manipulation part 127 of the slide type is installed at the main case part 121a.

An elastic member 128 that elastically pressurizes the brush roller 126 may be provided inside the other side of the main case part 121. A leaf spring, a coil spring, and the like may be used as the elastic member 128.

When the cover case part 121b coupled to the main case part 121a and pressurized by the brush roller 126 is released from the main case part 121a by the manipulation of the manipulation part 127, the elastic member 128 is configured to pressurize the brush roller 126. As a result, at least part of the brush roller 126 may be exposed to outside through the opening 121a'. In this instance, as shown, the cover case part 121b may be in a state in which it is coupled to the brush roller 126.

Figure 14:
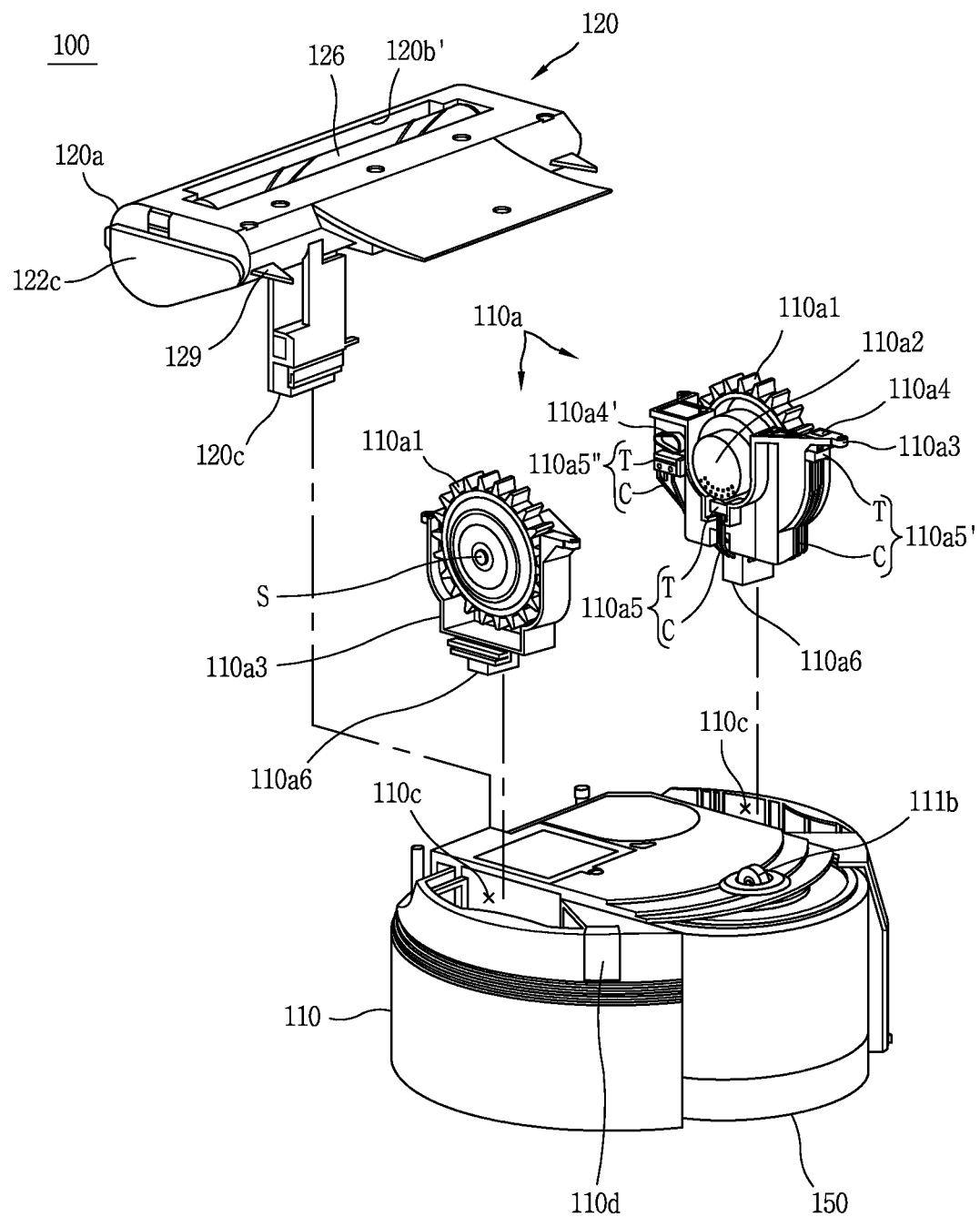
FIG. 14 is a perspective view illustrating that a cleaner body, a main wheel assembly and a suction unit are separated.
Figure 15:
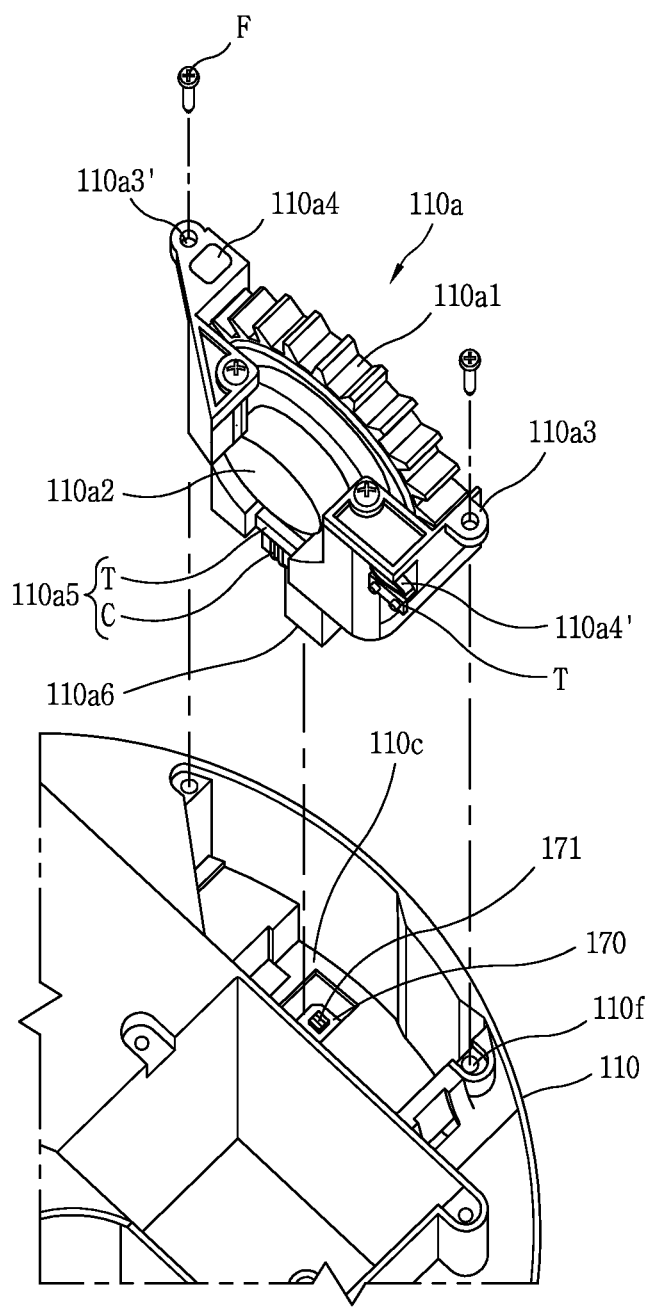
FIG. 15 is a conceptual view for explaining a physical and electric combination structure of the cleaner body and the main wheel assembly.

Hereinafter, the physical and electrical combination structure of the wheel unit 111, the suction unit 120, and the cleaner body 110 will be described in more detail. FIG. 14 is a perspective view illustrating that the cleaner body 110, the main wheel assembly 110a and the suction unit 120 are separated, and FIG. 15 is a conceptual view for explaining a physical and electric combination structure of the cleaner body 110 and the main wheel assembly 110a.

The main wheel assembly 110a and the suction unit 120 are configured by a module which may be coupled to or detached from the cleaner body 110. The module means an assembly of components as a constituent unit of a machine or a system, and indicates an independent apparatus which has a specific function by being assembled with several mechanical and electronic components.

The main wheel assembly 110a includes, as one module, a main wheel 110a1, a motor 110a2, a wheel cover 110a3, various sensors 110a4 and 110a4', sub-connectors 110a5, 110a5' and 110a5", and a main connector 110a6".

A concavo-convex portion for increasing a frictional force with the ground is provided on an external circumferential surface of the main wheel 110a1. When a frictional force between the main wheel 110a1 and the ground is not sufficient, the robot cleaner may slip on an inclined surface or fail to move or rotate in an intentional direction. Thus, it is necessary to provide a sufficient frictional force between the main wheel 110a1 and the ground.

Theoretically, the frictional force is unrelated to a contact area, but may be varied depending on the roughness of the contact area or the weight of an object. Accordingly, when a concavo-convex portion exists on an external circumferential surface of the main wheel 110a1, the roughness of the contact area is increased, thereby securing a sufficient frictional force.

The motor 110a2 is coupled on an inner surface of the main wheel 110a1. A rotational shaft S provided to the motor 110a2 is extended toward the main wheel 110a1 and connected to a center of the main wheel 110a1. The motor 110a2 may be provided to the left and right main wheel assemblies 110a, respectively, such that an independent driving of the left and right main wheel assemblies 110a may be accomplished.

The wheel cover 110a3 is provided for protecting the main wheel 110a1, supporting the motor 110a2 and the sub-connectors 110a5, 110a5', and 110a5", and mounting the main wheel assembly 110a. The wheel cover 110a3 is formed to cover at least part of the main wheel 110a1. Referring to FIG. 14, the wheel cover 110a3 covers an inner circumferential surface and an external surface of the main wheel 110a1. Though the external surface of the main wheel 110a1 is not covered by the wheel cover 110a3, it will be noted that it is covered by the cleaner body 110. However, the inner circumferential surface of the wheel cover 110a3 is separated from the main wheel 110a1 so as not to disturb rotation of the main wheel 110a1. Further, when the main wheel assembly 110a is mounted to the cleaner body 110, the wheel cover 110a3 is spaced apart from the ground.

The wheel cover 110a3 is configured to support the motor 110a2. The wheel cover 110a3 is provided with a space (not shown) for mounting the motor 110a2, and the motor 110a2 coupled to the main wheel 110a1 is inserted onto the space.

Referring to FIG. 15, a boss part 110a3' may be formed at the wheel cover 110a3. And a coupling member insertion hole 110f corresponding to the boss part 110a3' is formed at a bottom surface of the cleaner body 110. The main wheel assembly 110a is inserted into the space 110c provide at the bottom surface of the cleaner body 110, and the main wheel assembly 110a is mounted to the cleaner body 110 when a coupling member F is coupled to the boss part 110a3' and the coupling member insertion hole 110f.

Various sensors 110a4 and 110a4' may be selectively installed to the main wheel assembly 110a. FIG. 14 shows that a cliff sensor 110a4 and a wheel falling sensor 110a4' are installed to the wheel cover 110a3. The cliff sensor 110a4 has been described hereinbefore. However, the position of the cliff sensor 110a4 may be varied depending on the design. For instance, as shown in FIG. 14, the cliff sensor 110a4 may be provided at the bottom of the wheel cover 110a3.

The wheel falling sensor 110a4' may be provided at the wheel cover 110a3. The wheel falling sensor 110a4 includes a link L and a switch (not shown) to sense the sagging of the main wheel 110a1. When the main wheel 110a1 is downwardly moved from its original position, the link L connected to the main wheel 110a1 is rotated to press the switch. As a result, the switch transmits a pressure signal to the controller of the robot cleaner.

The wheel falling sensor 110a4' may be used in the driving control of the main wheel 110a1 and the control of an escape from an obstacle. For instance, when a user lifts the robot cleaner, the main wheels 110a1 at both sides are naturally downwardly moved from its original position. The controller may stop driving of both the main wheels 110a1 based on a pressure signal transmitted from the switch.

Further, when a pressure signal is transmitted from one of the switches of the left and right main wheels 110a1, the controller may rotate the main wheels 110a1 in a reverse direction. This corresponds to a control to escape from an obstacle when the cleaner body 110 is caught by the obstacle and one of the main wheels 110a1 runs idle.

The various sensors 110a4 and 1110a4' are electrically connected to the main connector 110a6" through the sub-connectors 110a5, 110a5' and 110a". The sub-connectors 110*a*5, 110*a*5' and 110*a*" are configured to electrically connect various electronic components provided to the main wheel assembly 110*a* to the main connector 10*a*6". The sub-connectors 110*a*5, 110*a*5' and 110*a*" may include a cable S and a connection terminal T. The cable C is protruded from the main connector 110*a*6", and the connection terminal T is fixed to an end of the cable C. The wheel cover 110*a*3 may form a disposition area of the cable C, and may include a cable holder (not shown) for fixing the cable C.

In FIG. 14, there is shown that the sub-connectors 110*a*5, 110*a*5' and 110*a*" are exposed to an external surface of the wheel cover 110*a*3. However, the sub-connectors 110*a*5, 110*a*5' and 110*a*" may be provided to be covered by the wheel cover 110*a*3.

A connection socket (not shown) for an electric connection is provided to the motor 110*a*2 or the sensors 110*a*4 and 110*a*4' which are coupled to the wheel cover 110*a*3. When the connection terminals T of the sub-connectors 110*a*5, 110*a*5' and 110*a*" are inserted into the connection socket, electric connections between the motor 110*a*2 and the main connector 110*a*6" and between the sensors 110*a*4 and 110*a*4' and the main connector 110*a*6" are made. When the physical and electrical connections between each component provided to the main wheel assembly 110*a* are made, the main wheel assembly 110*a* may be classified as one module.

The main connector 110*a*6" may be protruded from the wheel cover 110*a*3 towards inside of the cleaner body 110. The direction that the main connector 110*a*6" is protruded from the wheel cover 110*a*3 is identical to that the main wheel assembly 110*a* is inserted into the cleaner body 110. A space 110*c* for mounting the main wheel assembly 110*a* is provided to the cleaner body 110, and the main wheel assembly 110*a* is inserted in the space 110*c*. A main printed circuit board 170 is installed in the cleaner body 110, and one surface of the main printed circuit board is exposed through the space for coupling the main wheel assembly 110*a*.

A connection terminal 171 is provided to one surface of the main printed circuit board 170, and the connection terminal 171 is provided at a position corresponding to the main connector 110*a*6". And the main connector 110*a*6" is formed in a shape of a socket corresponding to the connection terminal 171 of the main printed circuit board 170.

Accordingly, when the main wheel assembly 110*a* is inserted into the cleaner body 110, the connection terminal 171 of the main printed circuit board 170 is naturally inserted into the socket of the main connector 110*a*6". As a result, an electrical connection between the main printed circuit board 170 and the main wheel assembly 110*a* is made. The position of the connection terminal 170 and that of the connection socket may be changed to each other. Additionally, the coupling member F is configured to couple the wheel cover 110*a*3 with the cleaner body 110.

Such a physical and electrical connection structure may be identically applicable to the connection between the suction unit 120 and the cleaner body 110. In FIG. 14, there is shown that the suction unit 120 is also provided with a main connector 120*c* like the main wheel assembly 110.

The main connector 120*c* of the suction unit 120 is electrically connected to various electronic components provided at the suction unit 120 through a sub-connector (not shown). When the suction unit 120 is installed to the cleaner body 110, the main connector 120*c* of the suction unit 120 may be naturally coupled to the connection terminal (not shown) of the main printed circuit board 170. Especially, the direction that the main connector 120*c* is protruded from the suction unit 120 is identical to that the suction unit 120 is inserted into the cleaner body 110.

According to the physical and electrical connection structure in accordance with the present disclosure, an electrical connection is naturally made as the main wheel assembly 110*a* or the suction unit 120 is physically coup[led to the cleaner body 110. As a result, an assembling work between each module and the cleaner body 110 is facilitated, and when each module is disassembled from the cleaner body 110, it does not make an effect on other module or parts, thereby preventing occurrence of a secondary failure.

If various modules are physically coupled, primarily, to the cleaner body 110, and then secondarily electrically connected, unlike the present disclosure, the assembling work is difficult and a secondary failure may occur. Also, since the physical and electrical connection has to be accomplished by a twice-time process, not by a one-time process, the number of the assembly process is increased. Further, when the cleaner is disassembled due to a first failure, it may make an effect on other parts, thereby occurring a secondary failure.

Especially, the physical and electrical connection structure according to the present disclosure is advantageous in a mass production by an automation. The manufacturing process of the modernized robot cleaner is precisely performed by a robot that is mechanically operated, and is developed in a direction to avoid an inaccurate involvement of the people.

When the physical and electrical connection structure is applied to a robot cleaner, an assembling between the cleaner body 110 and each module can be accomplished by a one-time automation process. Further, the assembling means not only a physical connection, but an electrical connection. Since the protruded direction of the main connector 120 and the insertion direction of the main wheel assembly 110*a* are identical to each other, it may be understood that the physical connection direction and the electrical connection direction between each module are identical to each other.

Accordingly, the structure according to the present disclosure is much advantageous in an automation process without a people's involvement.

Unexplained reference numerals in FIGS. 14 and 15 will be replaced by the previous description. However, reference numeral 110*d* denotes a switch cover, and hereinafter the structure of a power switch of the robot cleaner will be described.

Figure 16A:
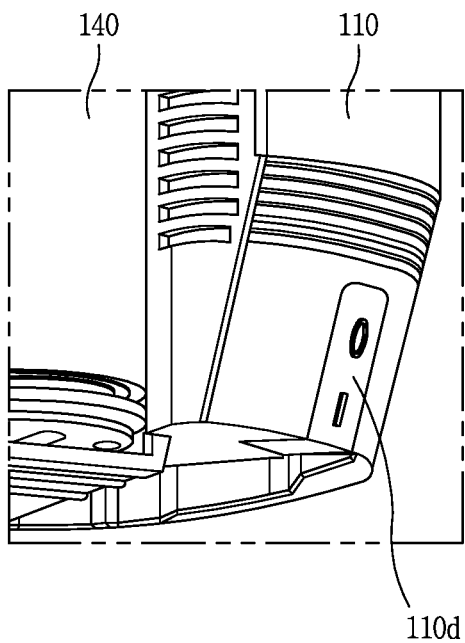
FIGS. 16A and 16B are conceptual views partially illustrating an external appearance of the cleaner body in which a switch cover is exposed.
Figure 16B:
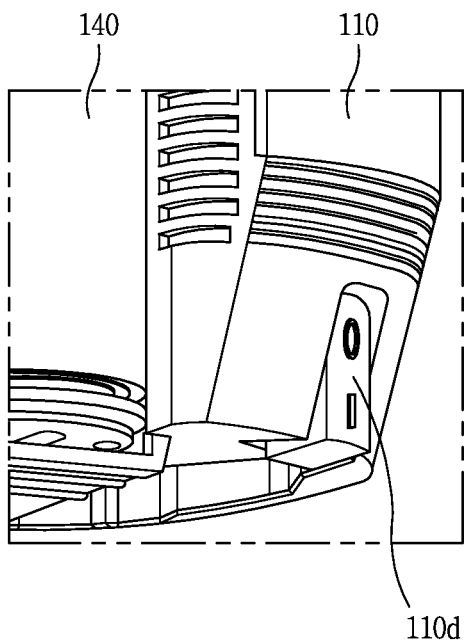
Figure 17:
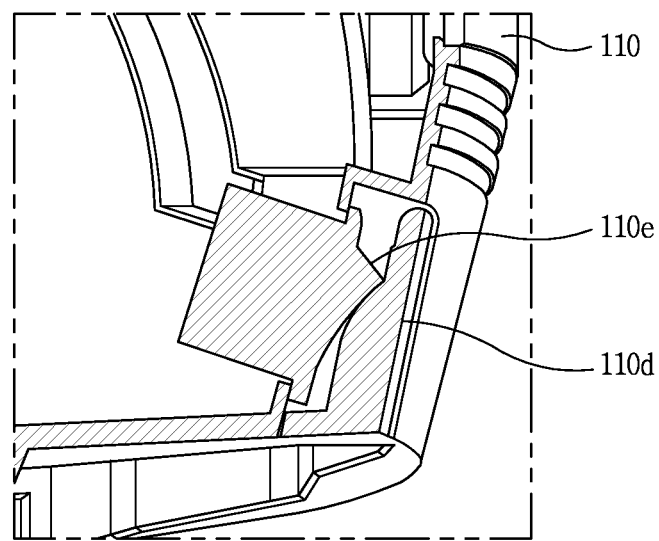
FIG. 17 is a sectional view illustrating an inside structure of a power switch and a switch cover.

FIGS. 16A and 16B are conceptual views partially illustrating an external appearance of the cleaner body 110 in which a switch cover 110*d* is exposed, and FIG. 17 is a sectional view illustrating an inside structure of a power switch 110*e* and the switch cover 110*d*. The power switch 110*e* is adapted to turn on or off the power of the robot cleaner. Referring to FIG. 17, the power switch 110*e* includes a toggle switch. Referring to FIGS. 16A and 16B, the switch cover 110*d* is provided at the outside of the power switch 110*e*. The switch cover 110*d* is provided to be exposed to an appearance of the cleaner body 110 and configured to cover the power switch 110*e*.

Since the robot cleaner autonomously performs the cleaning, while moving around a certain area according to a preset algorithm, it is not preferable for a specific part to protrude from the cleaner body 110. For instance, when the switch cover 110*d* is excessively protruded from the cleaner body 110, it is apprehended that the switch cover 110*d* is caught by an object such as a wall or a door, while the robot cleaner is moving. Further, for the beautiful appearance of the robot cleaner, it is preferable for the switch cover 110*d* not to be protruded from the cleaner body 110. Especially, the switch cover 110d has not to be protruded from the cleaner body 110 when the power switch 110e is turned on.

The switch cover 110d according to the present disclosure is formed to have a curved surface of a certain curvature together with an external surface of the cleaner body 110, or to have a plane together with an external surface of the cleaner body 110. Referring to FIGS. 16A and 17, it will be noted that the switch cover 110e forms a curved surface of a certain curvature together with an external surface of the cleaner body 110 when the power switch 110e is turned on (the portion "I" is pressed).

On the contrary, referring to FIG. 16B, when the power switch 110e is turned off (the portion "O" is pressed), it is noted that the portion "I" of the switch cover 110d is protruded from the external surface of the cleaner body 110. If the power switch 110e is comprised of a push switch and an elastic member is coupled to the switch cover 110d, it is possible to implement the structure in which the switch cover 110d is not exposed from the cleaner body 110 irrespective of turning on or off of the power switch 110e.

Figure 18:
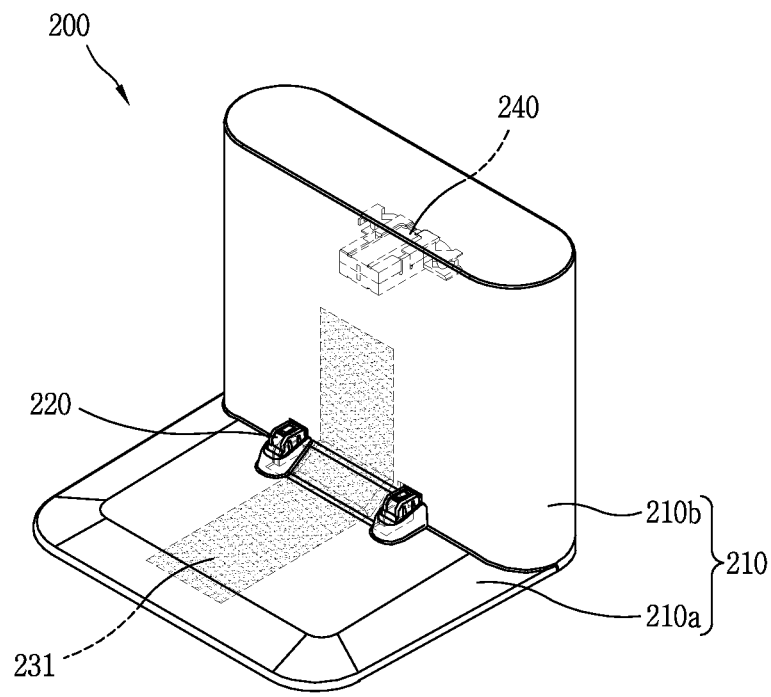
FIG. 18 is a perspective view illustrating a charging station according to the present disclosure.

Hereinafter, a charging station for charging a robot cleaner will be described. FIG. 18 is a view illustrating the charging station 200 according to the present disclosure.

Since the robot cleaner is wirelessly driven, a battery has to be charged for a consistent operation before the power is exhausted. Especially, it is preferable that the robot cleaner automatically (autonomously) performs not only the cleaning, but also the charging, for the user's convenience. The charging station 200 is an apparatus for an automatic charging (or an autonomous charging) of the robot cleaner.

The appearance of the charging station 200 is determined by a housing (or outer housing) 210. The housing 210 is formed of a transparent or a semitransparent material. Thus, the components within the housing 210 may be visually exposed to the outside through the housing 210. In FIG. 18, there is shown that the light emitting device fixing member 240 and the absorption pattern 231 are visually exposed to outside through the housing 210.

The housing 210 includes a floor 210a and a wall 210b. In FIG. 18, the direction that the floor 210a is formed based on the wall 210b corresponds to a front of the charging station 200, and the opposite direction corresponds to a rear of the charging station 200.

A charging terminal 220 is exposed to outside of the housing 210, and configured to contact the charging terminal 125 (refer to FIG. 12) of the robot cleaner. Since the charging terminal of the robot cleaner is installed to the suction unit 120, the charging terminal 220 of the charging station 200 should be provided to a position corresponding to the charging terminal 125 of the robot cleaner. Thus, the charging terminal 220 may be exposed through the floor 210a of the housing 210 or a boundary between the floor 210a and the wall 210b.

The charging station 220 is connected to a power cable (not shown). When a plug of the power cable is inserted in a power outlet, the charging station 200 may be in a state in which the robot cleaner is chargeable.

A preparation process for charging the robot cleaner by the charging station 200 may be divided into a homing and docking. The term 'homing' means that the robot cleaner approaches to the charging station 200. And the term 'docking' means that the charging terminal of the robot cleaner which has approached to the charging station 200 is connected to the charging terminal 220 of the charging station 200. Thus, the docking is performed after the homing in terms of time.

When the docking of the robot cleaner to the charging station 200 is completed, the battery of the robot cleaner is automatically charged through the charging terminal 220 of the charging station 200 and the charging terminal of the robot cleaner. The processes of the homing, docking and charging may be synthetically referred to as an automatic charging or an autonomous charging.

Figure 19:
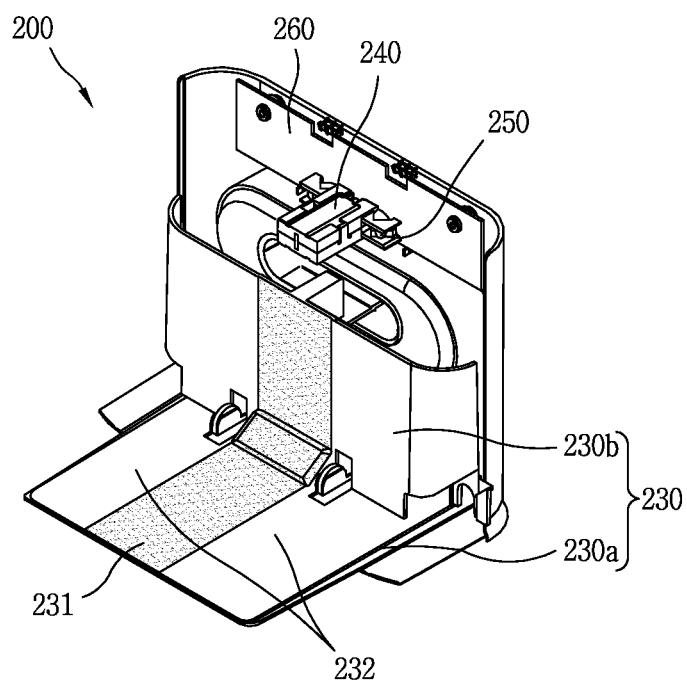
FIG. 19 is a conceptual view illustrating a charging station according to another embodiment of the present disclosure.

The components for automatic charging of the robot cleaner are provided within the housing 210. The structures of the above components will be described with reference to FIG. 19. FIG. 19 is a perspective view illustrating inside of the housing 210 by separating the housing 210 from the charging station 200 shown in FIG. 18.

When separating the housing 210 from the charging station 200, an inner housing 230, a light emitting device (or light emitter) 250, a light emitting device fixing member (or light housing) 240, and a printed circuit board 260 are additionally exposed, besides the charging terminal 220.

The inner housing 230 is provided in front of the charging station 200. The inner housing 230 includes a floor surface (or horizontal surface) 230a and a wall surface (or vertical surface) 230b. The floor surface 230a of the inner housing 230 is provided under the floor 210a of the housing 210, and the wall surface 230b of the inner housing 230 is provided at the rear of the wall 210b of the housing 210.

The charging terminal 220 of the charging station 200 is installed on the floor surface 230a of the inner housing 230, or at a boundary between the floor surface 230a and the wall surface 230b. The charging terminal 220 may be provided in two for an electrical connection of (+) and (−) electric poles, and the two charging terminals 220 may be provided to be spaced apart from each other.

The inner housing 230 is provided with an absorption pattern 231 and a reflection pattern 232 for docking of the robot cleaner. The absorption pattern 231 is formed in black to absorb an optical signal outputted from the robot cleaner for docking. The absorption pattern 231 may be provided between the two charging terminals.

The absorption pattern 231 is extended in a docking direction of the robot cleaner. Referring to FIG. 19, the absorption pattern 231 is extended at the boundary between the floor surface 230a and the wall surface 230b of the inner housing 230 towards the front of the charging station 200. Further, the absorption pattern 231 is extended at the boundary between the floor surface 230a and the wall surface 230b towards a front end of the wall surface 230b.

There is a technical ground for the absorption pattern 231 to have the structure that is extended towards the front side and the upper end of the wall surface 230b. This is because the docking of the robot cleaner is to be induced through the sensing movement of the sensing unit 130 (refer to FIG. 4) provided in the robot cleaner.

The wall surface 230b of the inner housing 230 is provided below the light emitting device fixing member 240 which will be described later. The upper end of the wall surface 230b does not cover the front of the light emitting device fixing member 240. Thus, the absorption pattern 231 is provided below the light emitting device fixing member 240.

The absorption pattern 231 is provided at a position identical to the light emitting device fixing member 240 based on the left and right directions. Though the height of the absorption pattern 231 and that of the light emitting device fixing member 240 are different from each other, it will be understood that the parallel positions thereof are identical to each other since the base is made on the left and right directions.

There are two technical grounds to dispose the absorption pattern 231 below the light emitting device fixing member 240 and at the same height based on the left and right directions. One is to induce a docking of the robot cleaner through the sensing movement of the sensing unit provided to the robot cleaner. The other is to induce an accurate docking of the robot cleaner in cooperation with an optical signal from the light emitting device 250 accommodated in the light emitting device fixing member 240.

The reflection pattern 232 is formed in black so as to reflect an optical signal outputted from the robot cleaner for docking. The reflection pattern 232 is also formed on the inner housing 230 like the absorption pattern 231. The reflection pattern 232 may be formed at both sides of the absorption pattern 231.

The reflection pattern 232 is extended from the boundary between the bottom surface 230a and the wall surface 230b of the inner housing 230 towards the front of the charging station 200. Further, the reflection pattern 232 is extended from the boundary between the bottom surface 230a and the wall surface 230b of the inner housing 230 towards an upper end of the wall surface 230b.

The first laser 132a (refer to FIG. 4) and the second laser 132b (refer to FIG. 4), which are provided to the robot cleaner, are configured to irradiate an optical signal, and the camera 132c (refer to FIG. 4) is configured to photograph the optical signal. The optical signal irradiated from the first and second lasers 132a and 132b is absorbed by the absorption pattern 231 and reflected from the reflection pattern 232. The camera 132c may induce an accurate docking of the robot cleaner by sensing such a variation of the optical signal. However, the docking of the robot cleaner is not performed only by the absorption pattern 231 and the reflection pattern 232, but may be performed in cooperation with the light emitting device 250 which will be described later.

The printed circuit board 260 is installed within the housing 210, and one surface thereof may be vertically provided towards the front of the charging station 200. The printed circuit board 260 is configured to control the operation of the charging station 200 on the whole. Thus, the printed circuit board 260 may function as a controller of the charging station 200. A plurality of electronic components provided to the charging station 200 may be electronically controlled by the printed circuit board 260.

The light emitting device 250 is connected to the printed circuit board 260. And a light emitting device fixing member 240 may be fixed by the printed circuit board 260, or the housing 210 provided at the rear side of the printed circuit board 260. The specific structure of the light emitting device 250 and the light emitting device fixing member 240 will be described later.

Figure 20:
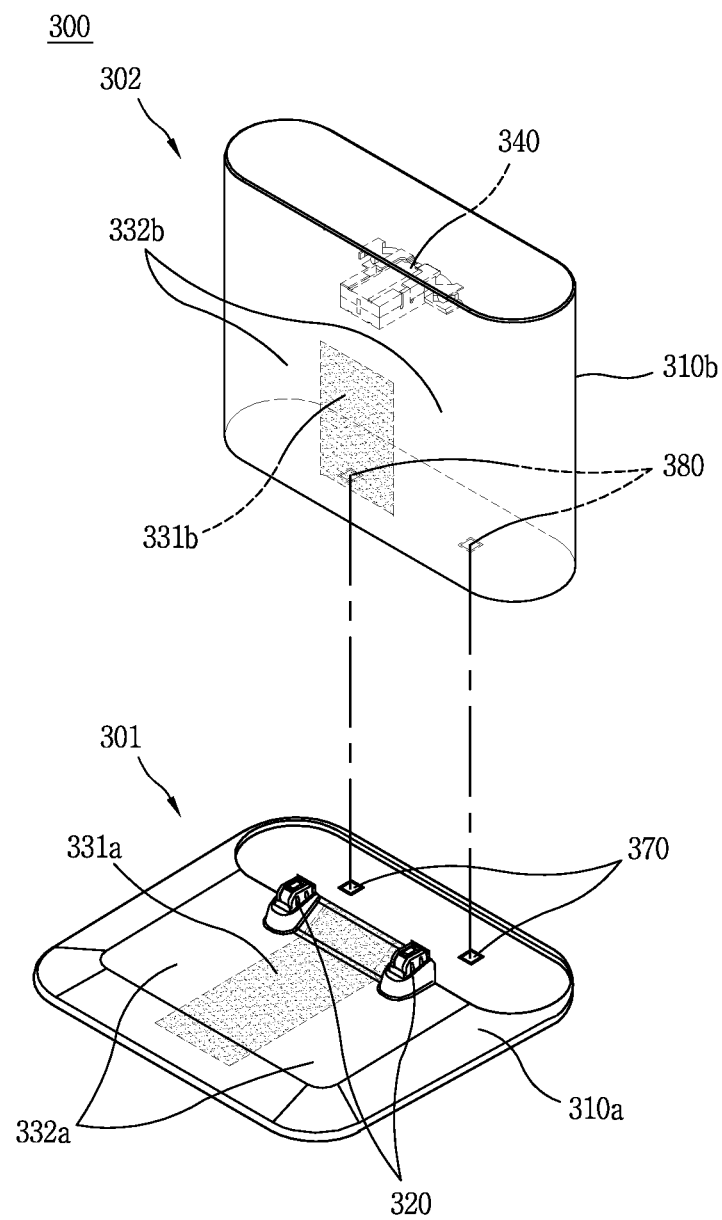
FIG. 20 is a perspective view illustrating an inside of a housing after separating the housing from the charging station shown in FIG. 18.

Hereinafter, another embodiment of the charging station will be described. FIG. 20 is a conceptual view illustrating another embodiment of the charging station 300. The wall of the charging station 300 may be formed by a virtual wall (or virtual wall module) 302. The virtual wall 302 is adapted to set a movable area of the robot cleaner. The virtual wall 302 is configured to generate an avoidance signal or an inducement signal in a straight line direction or in a circumferential direction.

For instance, the virtual wall 302, which is set at a front door, may generate an avoidance signal to prevent the robot cleaner from approaching to an area where a head exists like the front door. For another instance, when the virtual wall is combined with a base 301, the virtual wall 302 may generate an inducement signal (an optical signal for inducing a homing and an optical signal for inducing a docking) for docking of the robot cleaner.

FIG. 20 shows that a wall of the charging station 300 is formed by a virtual wall 302. In this instance, the internal structure of the virtual wall 302 is substantially similar to that of the wall 210b of the charging station 200 described in FIG. 19.

The virtual wall 302 is formed to be combined with the base 301. The base 301 may include a robot cleaner charging terminal 320 and a virtual wall charging terminal 370. The virtual wall 302 combined with the charging station 300 may include a terminal 380 corresponding to the virtual wall charging terminal 370. Thus, when the virtual wall 302 is combined with the charging station 300, a charging of the battery (not shown) provided in the virtual wall 302 may be accomplished.

The virtual wall 302 may include an absorption pattern 331b having an external surface formed in black. The absorption pattern 331b may be formed on an inner circumferential surface of the wall 310b of the housing. The absorption pattern 331b is adapted to absorb an optical signal, similarly to the absorption pattern 231 as previously described in FIGS. 18 and 19. And reflection patterns 332b are formed on both sides of the absorption pattern 331b.

When the charging terminal 380 of the virtual wall 302 is coupled to the virtual wall charging terminal 370 of the base 301, the absorption pattern 331a of the base 301 and the absorption pattern 331b of the virtual wall 302 form one single consecutive pattern. For instance, the absorption pattern 331a of the base 301 forms a pattern of the floor, and the absorption pattern 331b of the virtual wall 302 forms a pattern of the wall surface.

Figure 21A:
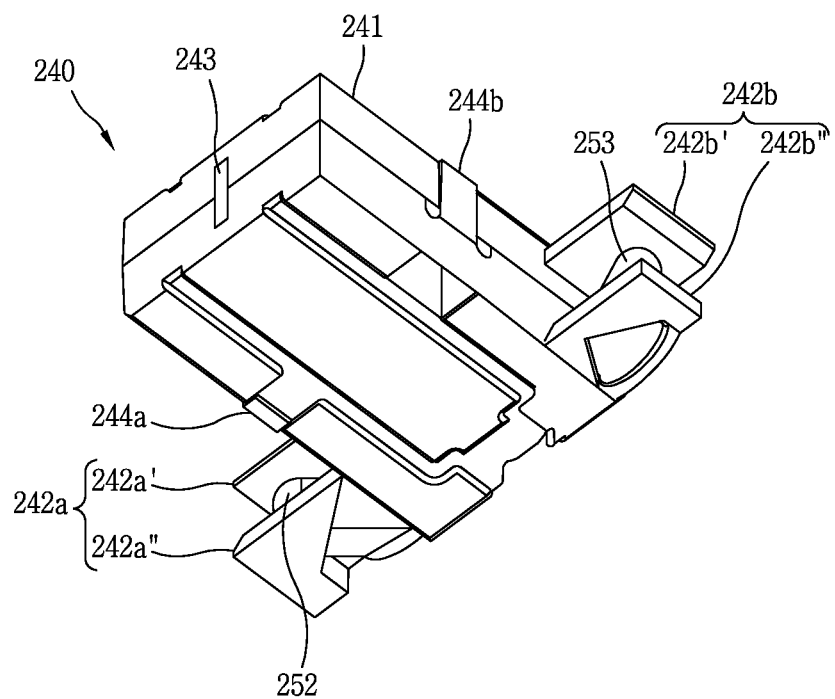
FIGS. 21A and 21B are perspective views illustrating a light emitting device and a light emitting device fixing member shown in FIG. 20, viewed from different directions.
Figure 21B:
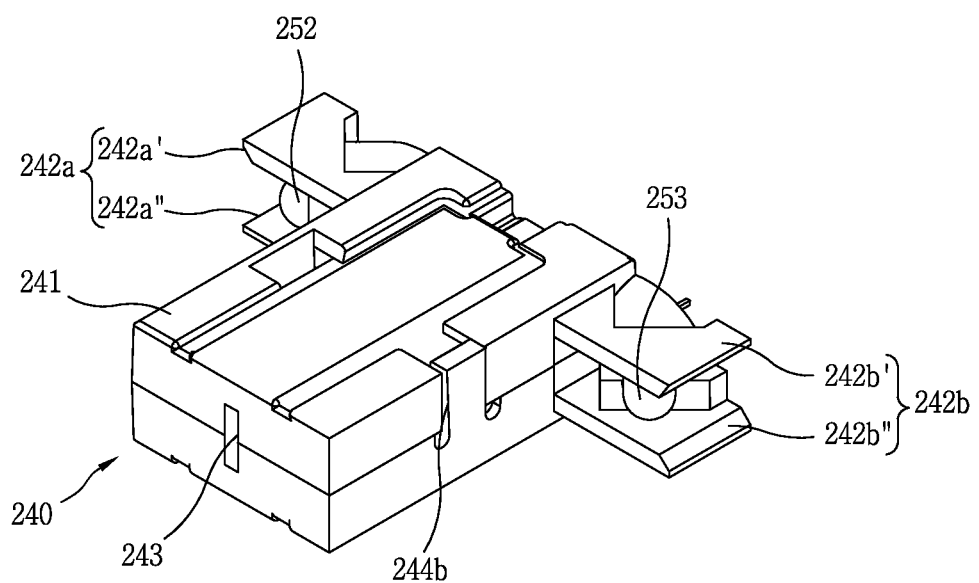
Figure 22:
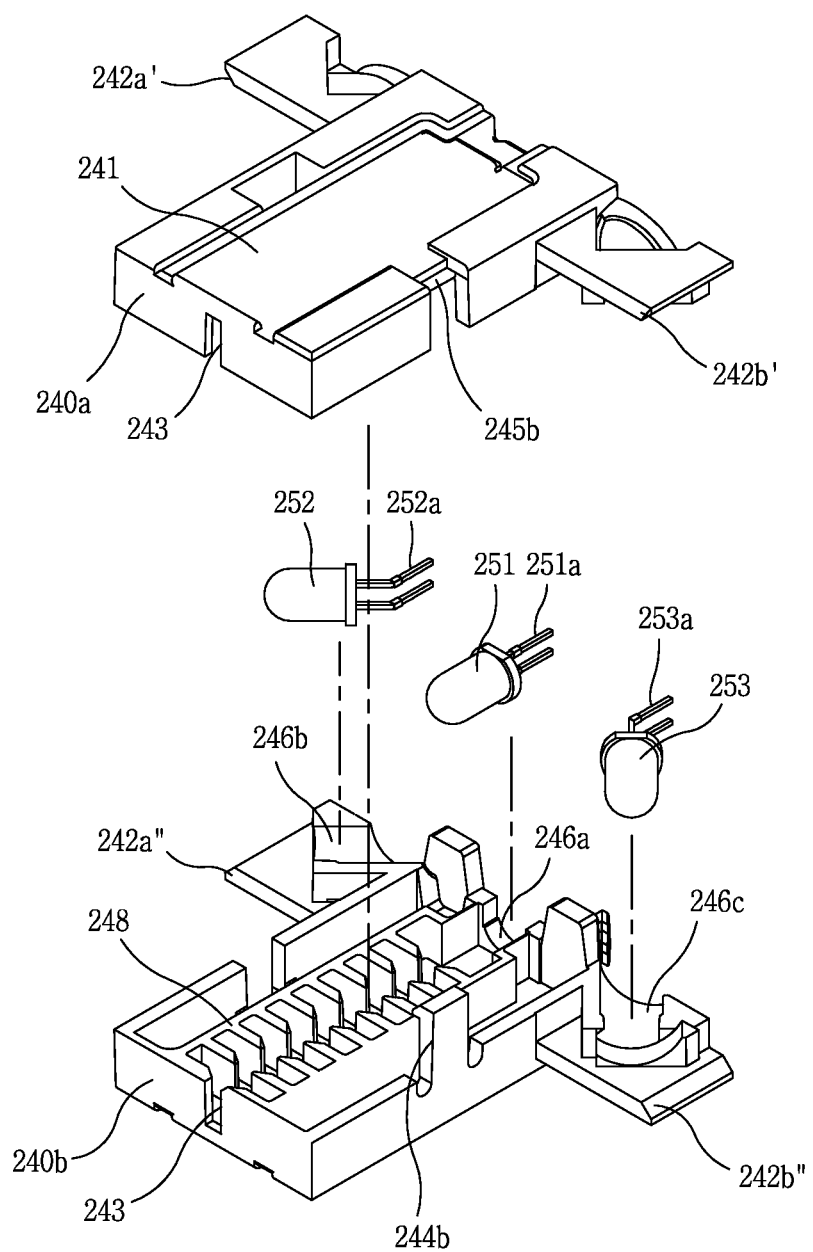
FIG. 22 is an exploded perspective view of the light emitting device and the light emitting device fixing member.
Figure 23:
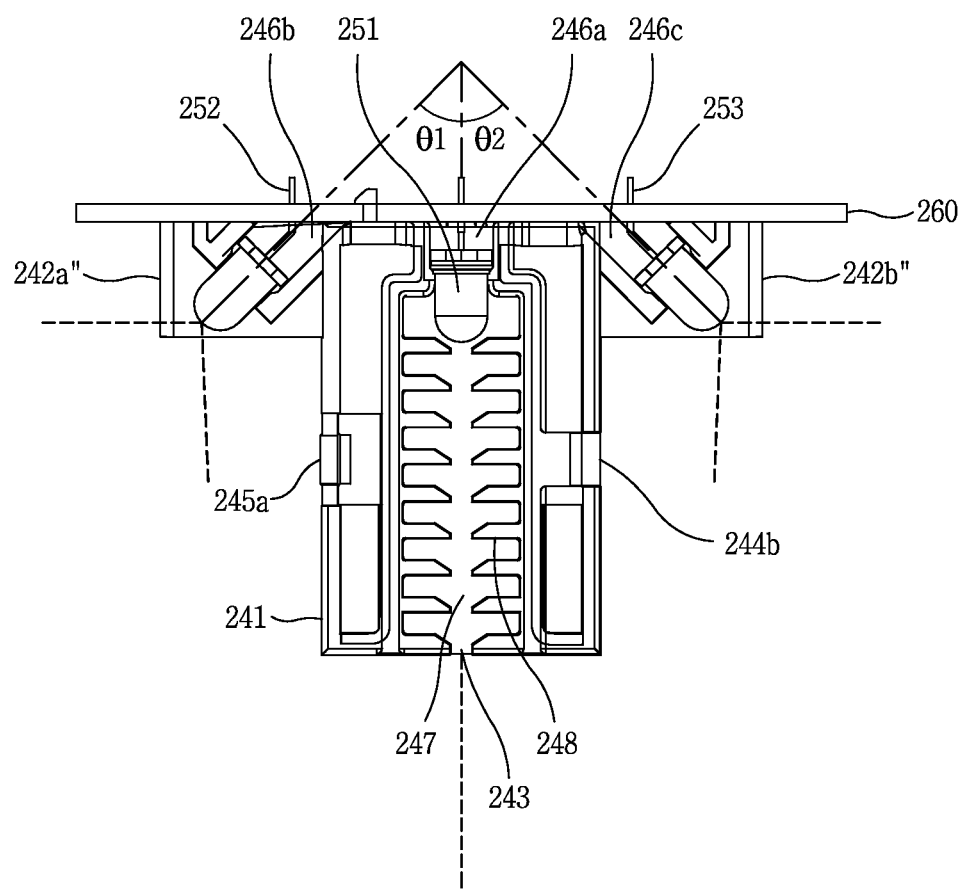
FIG. 23 is a sectional view of the light emitting device and the light emitting device fixing member.

Also the reflecting pattern 332a of the base 301 and the reflecting pattern 332b of the virtual wall 302 form consecutive one single pattern at both sides of the absorption patterns 331a and 331b, respectively. Other descriptions on the structure will be replaced by those as described before. For example, floor 310a may correspond to Hereinafter, the light emitting device 250 and the light emitting device fixing member 240 for fixing the light emitting device 250 will be described. FIGS. 21A and 21B are perspective views illustrating light emitting devices 252 and 253 included in the light emitting device 250 described in FIG. 19 and the light emitting device fixing member 240 shown in FIG. 19, viewed from different directions, FIG. 22 is an exploded perspective view of the light emitting devices 251, 252 and 253 and the light emitting device fixing member 240, and FIG. 23 is a sectional view of the light emitting device 251, 252 and 253 and the light emitting device fixing member 240.

A plurality of light emitting devices 251, 252 and 253 for inducing the homing and docking of the robot cleaner are provided within the charging station 200. First, the first light emitting device 251 is configured to generate an optical signal for inducing the docking of the robot cleaner. Referring to FIG. 23, the second light emitting device 251 is installed at the left side of the first light emitting device 251, and the third light emitting device 253 is installed at the right side of the first light emitting device 251.

The docking of the robot cleaner may be performed only after the homing of the robot cleaner is completed. Thus, the robot cleaner senses first a homing inducement optical signal which is outputted from the second and third light emitting devices 252 and 253, and then approaches to the charging station 200. Thereafter, the robot cleaner which moves around the charging station 200 senses a docking inducement optical signal outputted from the first light emitting device 251 and then docks with the charging station 200.

The first, second and third light emitting devices 251, 252 and 253 are connected to the printed circuit board 260. Referring to FIGS. 23 and 24, the first, second and third light emitting devices 251, 252 and 253 are provided, respectively, with a pair of terminal pins 251a, 252a and 253a. Referring to FIG. 23, the terminal pins 251a, 252a and 253a may be soldered to the printed circuit board 260.

The printed circuit board 260 may be vertically provided so that one surface thereof may be towards the front side of the charging station 200. Thus, the first, second and third light emitting devices 251, 252 and 253 may be provided to be towards in a horizontal direction.

In order to induce an accurate docking, the optical signal from the first light emitting device 251 should be outputted in the straight direction. On the other hand, the optical signals outputted from the second and third light emitting devices 252 and 253 are different from the optical signal outputted from the first light emitting device 251 on the point that they induce the homing. In order to induce the robot cleaner in the vicinity of the charging station 200 irrespective of the position, the angle of view of the sensing unit should be utilized to the utmost. And in order to utilize the angle of view of the sensing unit, the optical signals outputted from the second and third light emitting devices 252 and 253 should be horizontally spread out in all directions as wide as possible.

In order to spread the homing inducement signal out in all directions, it may be supposed that the second and third light emitting devices 252 and 253 are provided in parallel with the first light emitting device 251, and reflected light is spread out using an inclined reflector. However, such a structure may cause a diffused reflection of light. Further, the diffused reflection causes a loss of the intensity of radiation, resulting in reduction of the sensitivity of the signal sensed by the sensing unit of the robot cleaner.

When the first through third light emitting devices 251, 252 and 253 are provided towards the front side of the charging station 200, a coincidence of the optical signals may occur. This may cause the difference of the light intensity due to the position of the robot cleaner and a reduction in the sensitivity of the sensing unit.

Accordingly, the second and third light emitting devices 252 and 253 are preferably provided to be inclined to the first light emitting device 251 at a preset degree, rather than to be towards the front side of the charging station 200. This is because the second and third light emitting devices 252 and 253 should be inclined in a horizontal direction to secure a broader coverage. To form a coverage without a shadow region, the preset angle ranges preferably from 40° to 50°. More preferably, the preset angle should be 45°.

Considering the above, the light emitting device fixing member 240 according to the present disclosure is configured to set the position and direction of the light emitting devices 251, 252 and 253. The light emitting device fixing member 240 includes a first accommodation part (or first accommodation opening) 246a, a second accommodation part (or second accommodation opening) 246b and a third accommodation part (or third accommodation opening) 246c by which the position and direction of the first, second and third light emitting devices 251, 252 and 253 are set.

The first accommodation part 246a is configured to cover at least part of the first light emitting device 251. The first light emitting device 251 is accommodated in the first accommodation part 246a. The first accommodation part 246a is provided towards the front side of the charging station 200. Thus, the first accommodation part 246a is adapted to allow the first light emitting device 251 to be towards the front side of the charging station 200.

The second accommodation part 246b is provided at the left of the first light emitting device 251, and configured to cover at least part of the second light emitting device 252. The second light emitting device 252 is accommodated in the second accommodation part 246b. The second accommodation part 246b is inclined to the left with respect to the first accommodation part 246a at a preset angle ($\theta 1$) so that the second light emitting device 252 may be inclined to the left with respect to the first light emitting device 251. The preset angle ranges preferably from 40° to 50°, as described above.

The third accommodation part 246c is provided at the right of the first light emitting device 251, and configured to cover at least part of the third light emitting device 253. The third light emitting device 253 is accommodated in the third accommodation part 246c. The third accommodation part 246c is inclined to the right with respect to the first accommodation part 246a at a preset angle ($\theta 1$) so that the third light emitting device 253 may be inclined to the right with respect to the first light emitting device 251. The preset angle ranges preferably from 40° to 50°, as described above.

Since one surface of the printed circuit board 260 faces the front of the charging station 200, the first, second and third light emitting devices 251, 252 and 253 which are installed to the printed circuit board 260 are towards the front of the charging station 200. However, the position and direction of the second and third light emitting devices 252 and 253 which are soldered to the printed circuit board 260 are reset by the light emitting device fixing member 240. Specifically, the second light emitting device 252 is inclined to the left with respect to the first light emitting device 251 by the second accommodation part 246b at a preset angle.

The direction that the first light emitting device 251 faces and the direction of the first accommodation part 246a are originally identical to each other. Thus, the terminal pin 251a of the first light emitting device 251 is extended in the normal line direction of the printed circuit board 260 and connected to the printed circuit board 260. The direction of the first light emitting device 251 is fixed by the light emitting device fixing element 240, but not reset.

On the contrary, the terminal pin 252a of the second light emitting device 252 and the terminal pin 253a of the third light emitting device 253 are bent as much as the preset angle (40° to 50°), and extended in the normal line direction of the printed circuit board 260, then connected to the printed circuit board 260. This is because the directions of the second and third light emitting devices 252 and 253 are reset by the light emitting device fixing element 240.

As the directions of the second and third light emitting devices 252 and 253 are set to be inclined as much as the angle preset by the light emitting device fixing element 240, the homing inducement optical signal may be outputted at a broad coverage. Further, it is possible to solve the problem of the difference of the sensibility that may occur in the robot cleaner.

Referring to FIG. 22, the light emitting device fixing element 240 is formed by coupling an upper member 240a and a lower member 240b. Also the first, second and third accommodation parts 246a, 246b and 246c are formed by coupling the upper member 240a and the lower member 240b.

The upper member 240a is configured to cover upper portions of the first, second and third light emitting device 251, 252 and 253, and the lower member 240b is configured to cover lower portions of the first, second and third light emitting device 251, 252 and 253. The upper and lower members 240a and 240b may have the substantially symmetrical shape.

The upper and lower members 240a and 240b include hooks 244a and 244b and hook coupling parts 245a and 245b, respectively. When one side hook 244a is hooked to one side hook coupling part 245a and other side hook 244b is hooked to other side hook coupling part 245b, the coupling of the upper member 240a and the lower member 240b is accomplished.

The position and direction of the first, second and third light emitting devices 251, 252 and 253 may be set by only any one of the upper member 240a or the lower member 240b. However, it is not possible to prevent the loss of the optical signal which is outputted toward lower sides of the first, second and third light emitting devices 251, 252 and 253, respectively, only with the upper member 240a. Similarly, it is not possible to prevent the loss of the optical signal which is outputted toward upper sides of the first, second and third light emitting devices 251, 252 and 253, respectively, only with the lower member 240b. Accordingly, it is preferred that the light emitting device fixing member 240 includes the upper member 240a and the lower member 240b to prevent loss of the optical signal.

The light emitting device fixing member 240 includes a protrusion part (or protrusion) 241 which is protruded to the front of the first accommodation part 246a. The light emitting device fixing member 240 is coupled to the printed circuit board 260, and the protrusion part 241 is protruded from the one surface of the printed circuit board 260 toward the front of the charging station 200. The second light emitting device 252 is exposed at the left side of the protrusion part 241 and the third light emitting device 253 is exposed at the right side of the protrusion part 241.

It is general that the height that the robot cleaner is operated and the height that the charging station 200 is provided are identical to each other. Accordingly, it is preferred that the homing inducement optical signals outputted from the second and third light emitting devices 252 and 253 are focused in the horizontal direction.

The light emitting device fixing member 240 includes light guide (or light guides) parts 242a and 242b in order to guide the homing inducement signals outputted from the second and third light emitting devices 252 and 253 in a horizontal direction. The light guide parts 242a and 242b are formed at the tops 242a' and 242b' and at the bottoms 242a" and 242a" of the second and third light emitting devices 252 and 253, respectively, which are exposed at the left and right sides of the protrusion part 241. The light guide parts 242a and 242b may be protruded toward the direction that the second and third light emitting devices 252 and 253 emit light, and may be formed substantially in the plate shape.

Meanwhile, the light emitting device fixing member 240 is provided with a structure to form the docking inducement optical signal outputted from the first light emitting device 251 into a linear light. The structure for forming the linear light is provided within the protrusion part 241. The structure for forming the linear light includes a light path part (or light path cavity) 247, a linear light forming rib (or rib) 248 and a longitudinal slit 243.

The light path part 247 is formed within the protrusion part 241. The light path part 247 has a straight direction to induce the docking inducement optical signal outputted from the first light emitting device 251 in a straight direction. For instance, the light path part 247 faces the front of the charging station 200 from the first light emitting device 251.

The linear light forming ribs 248 are protruded at the left and right sides of the light path part 247 to form the docking inducement optical signal outputted from the first light emitting device 251 in the straight direction, and provided to be spaced apart from each other. The optical signal outputted from the first light emitting device 251 is processed into the type of linear light while passing through a plurality of linear light forming parts 248.

A longitudinal slit 243 is formed at an end of the light path part 247. The longitudinal slit 243 is formed in the "I" shape, and configured to determine the shape of the linear light emitted from the light path part 247.

The docking inducement optical signal is outputted in the shape of linear light by the linear light forming structure. The linear light induces an accurate docking in cooperation with the absorption pattern 231 and the reflection pattern 232 which have been described before.

Figure 24A:
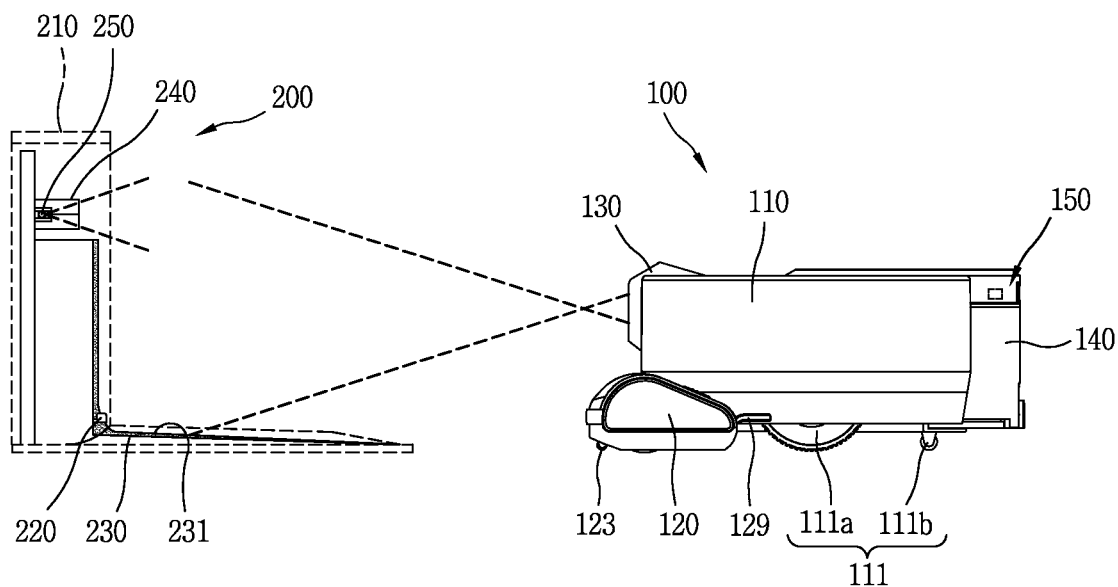
FIGS. 24A and 24B are conceptual views illustrating a process that the robot cleaner is homed and docked to the charging station.
Figure 24B:
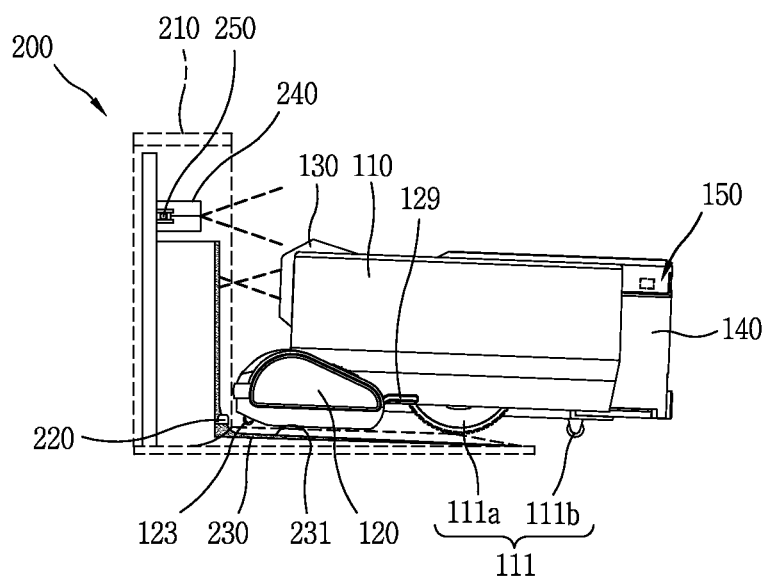

Hereinafter, the homing and docking processes of the robot cleaner 100 will be described. FIGS. 24A and 24B are conceptual views illustrating the process in which the robot cleaner 100 is homed and docked to the charging station 200.

The sensing unit 130 provided in the robot cleaner 100 consecutively senses optical signals transmitted from the light emitting device 250 of the charging station 200. When the battery of the robot cleaner 100 is required to be charged, the robot cleaner 100 is operated according to an automatic charging algorithm.

Referring first to FIG. 24A, the sensing unit 130 of the robot cleaner 100 senses a homing inducement optical signal outputted from the second and third light emitting devices 252 and 253. As a result, the robot cleaner 100 approaches to the charging station 200. The robot cleaner 100, which has approached to the charging station 200, moves around the charging station 200 until the docking guide optical signal is searched.

Next, referring to FIG. 24B, when the robot cleaner 100 searches the docking inducement optical signal, the robot cleaner 100 tries a docking. The docking inducement optical signal is outputted in a linear light by the linear light forming structure, and the sensing unit 130 of the robot cleaner 100 gradually approaches to the charging terminal, following the linear light.

In this instance, the absorption pattern 231 has been formed on the floor and the wall of the charging station 200 in the direction to induce the robot cleaner 100 to the charging terminal 220, and the reflection patterns 232 has been formed at both sides of the charging pattern. Thus, the robot cleaner 100 may successfully complete the docking by moving in the straight direction without any sway in the process that the robot cleaner 100 moves to dock the charging terminal 220. If the absorption pattern 231 is not formed on the charging station 200, a straight docking cannot be guaranteed in the docking process of the robot cleaner 100, and may cause a severe sway of the robot cleaner 100 in the docking process.

The robot cleaner, the charging station and the virtual walls as described hereinbefore are not limited to the structures and methods of the embodiments as described above, but part or the entirety of each embodiment may be selectively combined to make various modifications of the embodiments. According to the present disclosure, the position and direction of the first light emitting device which outputs a docking inducement optical signal of the robot cleaner and the positions and directions of the second and third light emitting devices which output homing inducement optical signals are set by the light emitting device fixing member.

Specifically, the first light emitting device is accommodated in the first accommodation part of the light emitting device fixing member and provided to be towards the front side of the charging station. The second light emitting device is accommodated in the second accommodation part and inclined to the left with respect to the first light emitting device at a preset angle. And the third light emitting device is accommodated in the third accommodation part and inclined to the right with respect to the first light emitting device at a preset angle. As a result, it is possible to output the homing inducement optical signal of the second and third light emitting devices at a wide coverage without any shadow region.

Further, since the docking inducement optical signal outputted from the first light emitting device is outputted in a linear light after being processed, it is possible to induce the robot cleaner to dock in the straight direction. When a straight light is irradiated to the robot cleaner which tries a docking to the charging station, an accurate docking can be implemented. Especially, the straight light can implement the docking of the cleaner more accurately in cooperation with the absorption pattern provided to the charging station.

Figure 25:
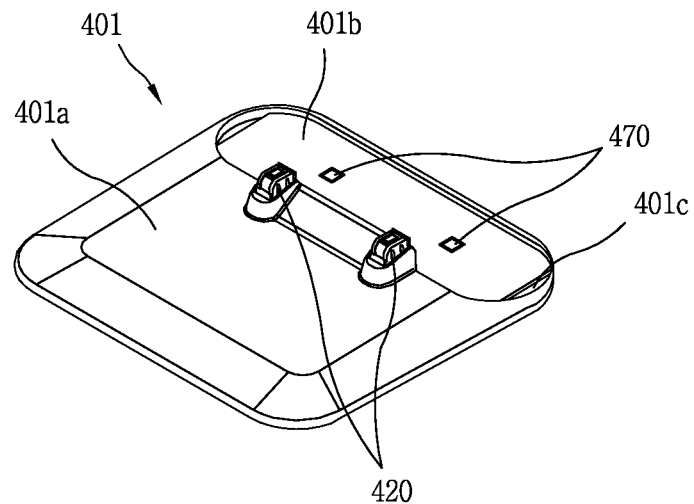
FIG. 25 is a perspective view illustrating an example of a base according to the present disclosure.

FIG. 25 is a perspective view illustrating one embodiment of the base 401 according to the present disclosure. The base 401 is configured such that the robot cleaner 100 is seated thereon for charging. The base 401 has a flat base plane so as to be placed on the floor.

The base 401 includes a robot cleaner placing part (or cleaner receiving surface) 401a, a robot cleaner charging terminal (or first terminal) 420, a virtual wall placing part (or virtual wall module accommodation surface) 401b, and a virtual wall charging terminal (or second terminal) 470. The robot cleaner placing part 401a is a region where the robot cleaner 100 is placed for charging. The robot cleaner placing part 401a is provided with the robot cleaner charging terminal 420.

The robot cleaner charging terminal 420 is formed to be contactable with the charging terminal provided to the robot cleaner 100. The charging terminal 125 (refer to FIG. 3) of the robot cleaner 100 may be provided at a lower surface of the suction unit 120 (refer to FIGS. 1 through 3). When the charging terminal 125 provided to the robot cleaner 100 contacts the robot cleaner charging terminal 420 of the base 401 in a state that a power plug is inserted in a wall outlet, charging of the robot cleaner 100 is performed.

The virtual wall placing part 401b is a region where the virtual wall (or virtual wall module) 402 (refer to FIG. 26) is placed for charging. An edge of the virtual wall placing part 401b may be configured to wrap around the lower end of the virtual wall 402 which is placed on the virtual wall placing part 401b. The virtual wall charging terminal 470 is formed on the virtual wall placing part 401b.

The virtual wall charging terminal 470 is formed to be contactable to a lower charging terminal 481 provided on the virtual wall 402. The lower charging terminal 481 may be provided at a bottom surface of the virtual wall 402. When the lower charging terminal 481 provided to the virtual wall 402 contacts the virtual wall charging terminal 470 of the base 401 in a state that a power plug is inserted in a wall outlet, charging of the virtual wall 402 is performed.

A protrusion part (not shown) or a recess part 401c may be formed on the virtual wall placing part 401b. As will be described later, the robot cleaner system according to the present disclosure includes a plurality of virtual walls 401, and the virtual walls 402, 402 and 404 (refer to FIG. 28) may be formed to be stacked in a multilayer. Thus, likewise any one of the virtual walls 403 is coupled on another virtual wall 402, the virtual wall placing part 401b should have the same shape as that of the upper end of each virtual walls 402, 403 and 404 in order to place the virtual wall 402 on the virtual wall placing part 401b.

The protrusion part or the recess part 401c corresponds to the above described same shape. As will be described later, each virtual wall 402 is provided with the protrusion part 402b or the recess part 402c, and the protrusion part (not shown) or the recess part 401c provided on the virtual wall placing part 401b have the same shape as that of the protrusion part 402b or the recess part 402c provided on the virtual walls 402.

FIG. 25 illustrates a configuration that the recess part 401c is formed on the virtual wall placing part 401b. The recess part 401c formed on the virtual wall placing part 401b has the same shape as the recess part 402c formed at the upper end of the virtual wall 402. The protrusion part 402b of the virtual wall 402 is inserted in the recess part 401c of the virtual wall placing part 401b. Unlike FIG. 25, a protrusion part may be formed on the virtual wall placing part 401b, and in this instance, a recess part is formed at a lower end of the virtual wall 402.

Meanwhile, it is preferable that a robot cleaner placing part 401a is formed at the front of the base 401, and the virtual wall placing part 401b is formed at the rear end of the base 401. This is because the robot cleaner 100 approaches to the robot cleaner placing part 401a from the front of the base 401 by a charging inducement optical signal provided from the virtual wall placing part 401b.

Figure 26:
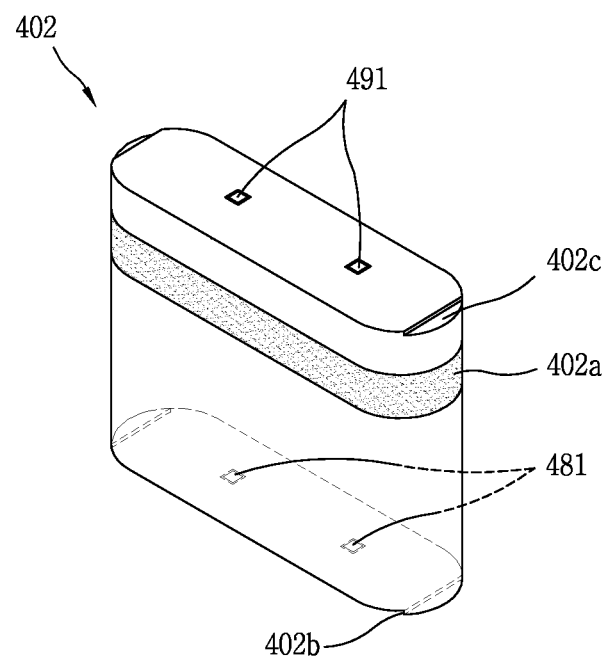
FIG. 26 is a perspective view illustrating an example of a virtual wall according to the present disclosure.

Hereinafter, the virtual wall 402 will be described. FIG. 26 is a perspective view illustrating the virtual wall 402 according to the present disclosure.

The virtual wall 402 is formed to be coupled to the base 401. For instance, the virtual wall 402 has the shape corresponding to the virtual wall placing part 401b of the base 401, and may be placed on the virtual wall placing part 401b. FIG. 26 shows that the virtual wall 401 has an elliptical cross section so as to correspond to the virtual wall placing part 401b having an elliptical circumference.

The virtual wall 402 includes a lower charging terminal 481 and an upper charging terminal 491. The lower charging terminal 481 is formed at a bottom surface of the virtual wall 402. The lower charging terminal 481 is configured to contact the virtual wall charging terminal 470 such that the virtual wall 402 may be charged. A battery (not shown) is contained in the virtual wall 402, and the battery is charged by a power supplied through the lower charging terminal 481.

The lower charging terminal 481 is provided at a position corresponding to the virtual wall charging terminal 470. For instance, as shown in FIG. 25, when two virtual wall charging terminals 470 are provided, two lower charging terminals 481 are provided to correspond thereto. Further, the separation distance between the two lower charging terminals 481 is the same as that between the two virtual wall charging terminals 470.

The upper charging terminal 491 is formed on an upper surface of the virtual wall 402. The upper charging terminal 491 is electrically connected with the lower charging terminals 481. The upper charging terminal 491 is configured to contact the lower charging terminal (for instance, 482 in FIG. 28) of other virtual wall (for instance, 403 in FIG. 28) which is stacked right on the virtual wall 402 such that the other virtual wall 403 may be charged.

The upper charging terminal 491 is provided at a position corresponding to the lower charging terminal 482 of the other virtual wall 403. For instance, since two lower charging terminals 491 of the other virtual wall 403 are provided, two upper charging terminals 491 are provided to correspond thereto. Further, the separation distance between the two upper charging terminals 491 is the same as that between the two lower charging terminals 482 of the other virtual wall 403

The virtual wall 402 includes a transmitting part (or transmitter) 402a. The transmitting part 402a is configured to transmit a charging inducement signal for an autonomous driving of the robot cleaner 100 and an access restriction signal. Transmission of which signal between the charging inducement signal or the access restriction signal by the virtual wall 402 may be determined by whether or not the virtual wall 402 is coupled to the base 402.

The virtual wall 402 coupled to the base 401 is configured to transmit a charging inducement signal for inducing the robot cleaner 100. The virtual wall 402 separated from the base 401 is configured to transmit an access restriction signal for prohibiting the robot cleaner 100 from approaching. The charging inducement signal and the access restriction signal may be transmitted to the front of the virtual wall 402, or around the virtual wall 402 in all directions.

The virtual wall 402 includes a protrusion part 402b and a recess part 402c so as to be coupled to other virtual wall 402 at a fixed position. It is described before that the base 401 includes a protrusion part (not shown) or a recess part 401c. The protrusion part 402b and the recess part 402c of the virtual wall 402 have substantially the similar function to that of the protrusion part (not shown) and the recess part 401c of the base 401. However, unlike the base 401 does not need to include both the protrusion part and the recess part 401c, it is preferable that the virtual wall 402 includes both the protrusion part 402b and the recess part 402c.

Any one of the protrusion part 402b and the recess part 402c is formed on an upper end of each of the virtual wall 402. On the other hand, the other of the protrusion part 402b and the recess part 402c is formed on a lower end of each of the other virtual wall 402. FIG. 26 shows that the protrusion part 402b is formed on the lower end of the virtual wall 402 and the recess part 402c is formed on the upper end of the virtual wall 402. However, unlike FIG. 26, the protrusion part is formed on the upper end of the virtual wall 402 and the recess part is formed on the lower end of the virtual wall 402.

When the virtual wall 402 includes the protrusion part 402b and the recess part 402c, the virtual wall 402 can be not only precisely placed on the virtual wall placing part 401b of the base 401, but also coupled to another virtual wall 403 at a fixed position. For instance, as shown in FIG. 26, the protrusion part 402b provided on the lower end of the virtual wall 402 is formed to be insertable in the recess part 401c of the virtual wall placing part 401b shown in FIG. 25. Thus, when the virtual wall 402 is placed on the virtual wall placing part 401b, the protrusion part 402b of the virtual wall 402 is inserted in the recess part 401c of the virtual wall placing part 401b. According to such a configuration, the virtual wall 402 can be placed on the virtual wall placing part 401b at a fixed position.

Similarly, when another virtual wall 403 is coupled to any one virtual wall 402, the protrusion part (for instance, 403b of FIG. 28) which is provided at an upper virtual wall 402 between the coupled two virtual walls 402 and 403 is inserted in the recess part 402c which is provided on the lower virtual wall 402.

In the present disclosure, it is very important that the virtual walls 402 are coupled to each other at a fixed position, or the virtual walls 402 are placed on the virtual wall placing part 401b at a fixed position. This is because contact between the virtual wall charging terminal 470 and the lower charging terminal 481 is made and the charging is accomplished only by placing the virtual wall 402 on the virtual wall placing part 401b without any separate guide. Similarly, when a plurality of virtual walls 402, 403 and 404 are stacked in a multilayer, contact between the lower charging terminal 482 and the upper charging terminal 491 is made only by stacking another virtual wall 403 on one virtual wall 402 without any separate guide, and the charging of the other virtual wall 403 is accomplished.

Figure 27:
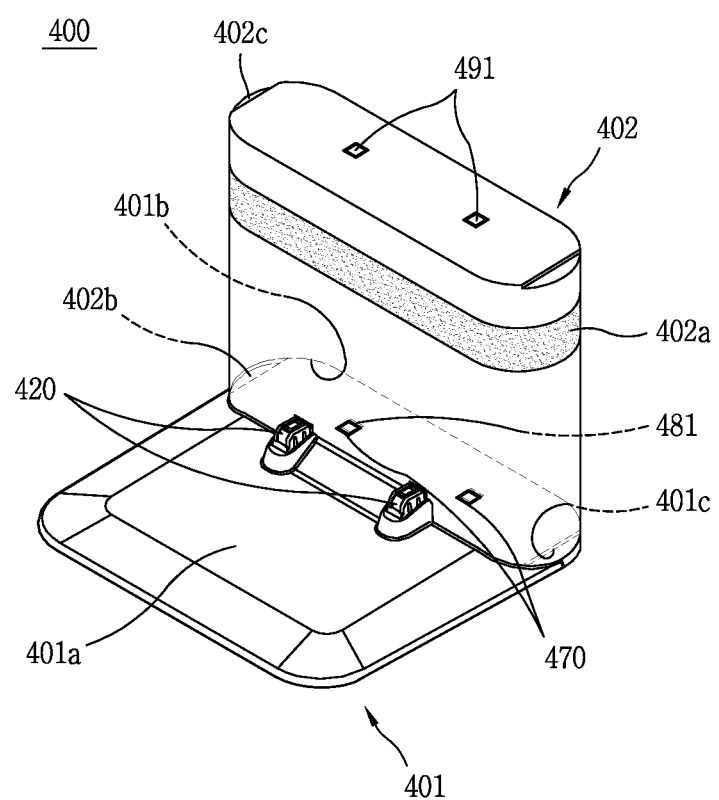
FIG. 27 is a perspective view illustrating an example of a charging station according to the present disclosure.

Hereinafter, the charging station 400 formed by coupling of the base 401 and the virtual wall 402 will be described. FIG. 27 is a perspective view illustrating one embodiment of the charging station 400 according to the present disclosure. The base 401 and the virtual wall 402 are coupled to each other and forms the charging station 400 for charging the robot cleaner 100.

As described before, the virtual wall 402 is placed on the virtual wall placing part 401b of the base 401. The protrusion part 402b provided on the base 402 is inserted in the recess part 401c provided on the virtual wall placing part 401b. As a result, the base 401 and the virtual wall 402 are coupled to each other at a fixed position, and the lower charging terminal 481 of the virtual wall 402 and the virtual wall charging terminal 470 of the base 401 are in contact with each other. The virtual wall 402 coupled to the base 401 is charged by contacting with the virtual wall charging terminal 470, and at the same time transmit a charging inducement signal.

A preparation process for automatically charging the robot cleaner at the charging station 400 may be divided into a homing and a docking. The homing indicates that the robot cleaner 100 approaches to the charging station 400. And the docking indicates that the charging terminal 125 of the robot cleaner 100 which approaches to the charging station 400 is in contact with the robot cleaner charging terminal 420 of the charging station 400. Accordingly, the docking is performed after the homing in view of the time.

The virtual wall 402 coupled to the base 401 transmits primary a homing inducement signal that induces the robot cleaner 100 to the charging station 400. When the robot cleaner 100 approaches to the charging station 400 in response to the homing inducement signal, the virtual wall 402 transits secondary a docking inducement signal that induces the robot cleaner 100 to be in contact with the robot cleaner charging terminal 420.

Since the homing is that the robot cleaner 100 approaches to the charging station 400 irrespective of the direction, the homing inducement signal may be transmitted in the direction of 360° around the virtual wall 402. Unlike this, since the docking needs a precise contact between the robot cleaner 100 and the robot cleaner charging terminal 420, it is preferred that the docking guide signal is transmitted to the front of the virtual wall 402.

Figure 28:
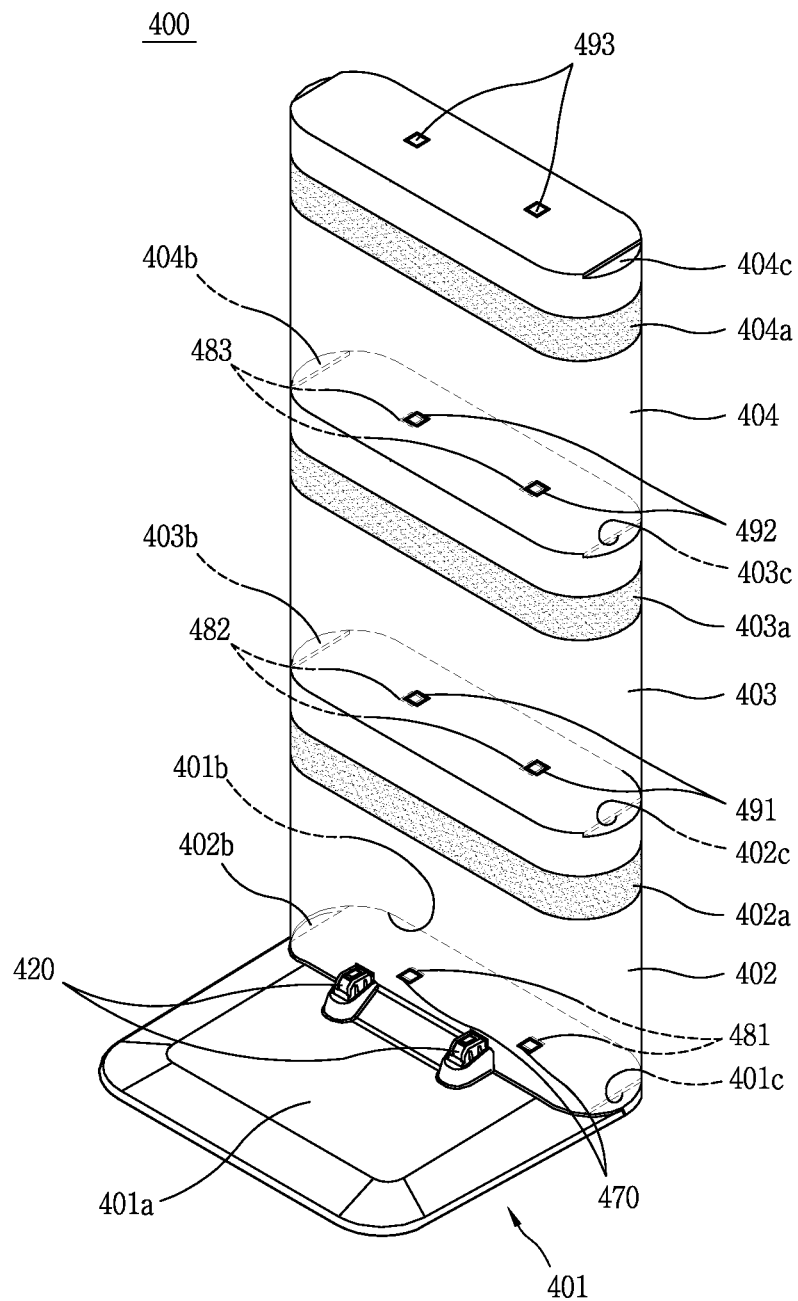
FIG. 28 is a perspective view illustrating a base and a plurality of virtual walls which are stacked on the base in a multilayer.

Hereinafter, the configuration that a plurality of virtual walls 402, 403 and 404 are simultaneously charged will be described. FIG. 28 is a perspective view illustrating the base 401 and the plurality of virtual walls 402, 403 and 404 stacked on the base 401 in a multilayer.

The robot cleaner system includes a plurality of virtual walls 402, 403 and 404. For the convenience of explanation, the lowermost virtual wall is named as a first virtual wall 402, the middle virtual wall is named as a second virtual wall 403, and the uppermost virtual wall is named as a third virtual wall 404, based on FIG. 28.

The plurality of virtual walls 402, 403 and 404 are formed to be stacked on the base 401 in a multilayer so as to be simultaneously charged on the base 401. For instance, the plurality of virtual walls 402, 403 and 404 have the same structure and shape. For instance, each of virtual walls 402, 403 and 404 may include the lower charging terminals 481, 482 and 483, the upper charging terminals 491, 492 and 493, the protrusion parts 402b, 403b and 404b, and the recess parts 402c, 403c and 404c, respectively, which have been described hereinbefore.

The first virtual wall 402 is placed on the virtual wall placing part 401b of the base 401. The protrusion part 402b provided to the lower end of the first virtual wall 402 is inserted in the recess part provided on the virtual wall placing part 401b of the base 401. The lower charging terminal 481 of the first virtual wall 402 contacts the virtual wall charging terminal 470 of the base 401. As a result, charging of the first virtual wall 402 is accomplished.

The second virtual wall 403 is placed on the first virtual wall 402. The protrusion part 403b provided to the lower end of the second virtual wall 403 is inserted in the recess part 402c provided at the upper end of the first virtual wall 402. The lower charging terminal 482 of the second virtual wall 403 contacts the upper charging terminal 491 of the first virtual wall 402. Since the lower charging terminal 481 of the first virtual wall 402 is in contact with the virtual wall charging terminal 470 of the base 401, charging of the second virtual wall 403 may be accomplished.

The third virtual wall 404 is placed on the second virtual wall 403. The protrusion part 404b provided to the lower end of the third virtual wall 404 is inserted in the recess part 403c provided at the upper end of the second virtual wall 402. The lower charging terminal 483 of the third virtual wall 404 contacts the upper charging terminal 492 of the second virtual wall 403. Since the lower charging terminal 482 of the second virtual wall 403 is in contact with the upper charging terminal 491 of the first virtual wall 402, charging of the third virtual wall 404 may be accomplished.

As described above, the plurality of virtual walls 402, 403 and 404 are stacked on the base 401 in a multilayer such that they can be simultaneously charged. However, it is sufficient for the first virtual wall 402 to transmit a charging inducement signal, but the second and third virtual walls 403 and 404 do not necessarily need to transmit the charging guide signal.

Figure 29:
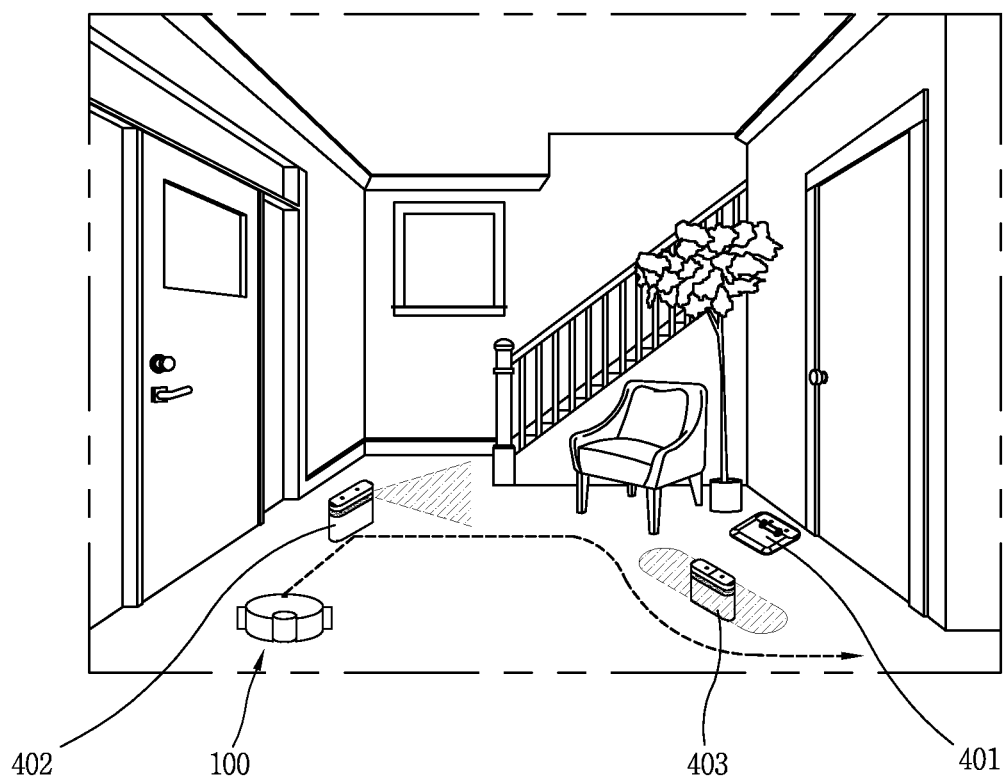
FIG. 29 is a conceptual view illustrating an operation of the robot cleaner system.

Hereinafter, the operation of the robot cleaner 100 and the charging station 400 will be described. FIG. 29 is a conceptual view illustrating the operation of the robot cleaner system.

The robot cleaner 100 is configured to perform cleaning while autonomously traveling based on an autonomous driving program. In the autonomous traveling of the robot cleaner 100, various sensors provided in the robot cleaner 100 are used.

The virtual walls 402 and 403 which are separated from the base 401 transmit an access restriction signal. Thus, when the robot cleaner 100 approaches to the virtual wall 402 which is separated from the base 401, the robot cleaner 100 senses an access restriction signal which is transmitted from the virtual walls 402 and 403. The robot cleaner 100, which senses the access restriction signal, does not approach to the virtual walls 402 and 403 any further, and moves to perform cleaning another area.

From FIG. 29, it is noted that the first virtual wall 402 transmits an access restriction signal to the front, and the second virtual wall 403 transmits an access restriction signal in the direction of 360°. The transmission type of the access restriction signal may be determined by a user's setting.

Figure 30:
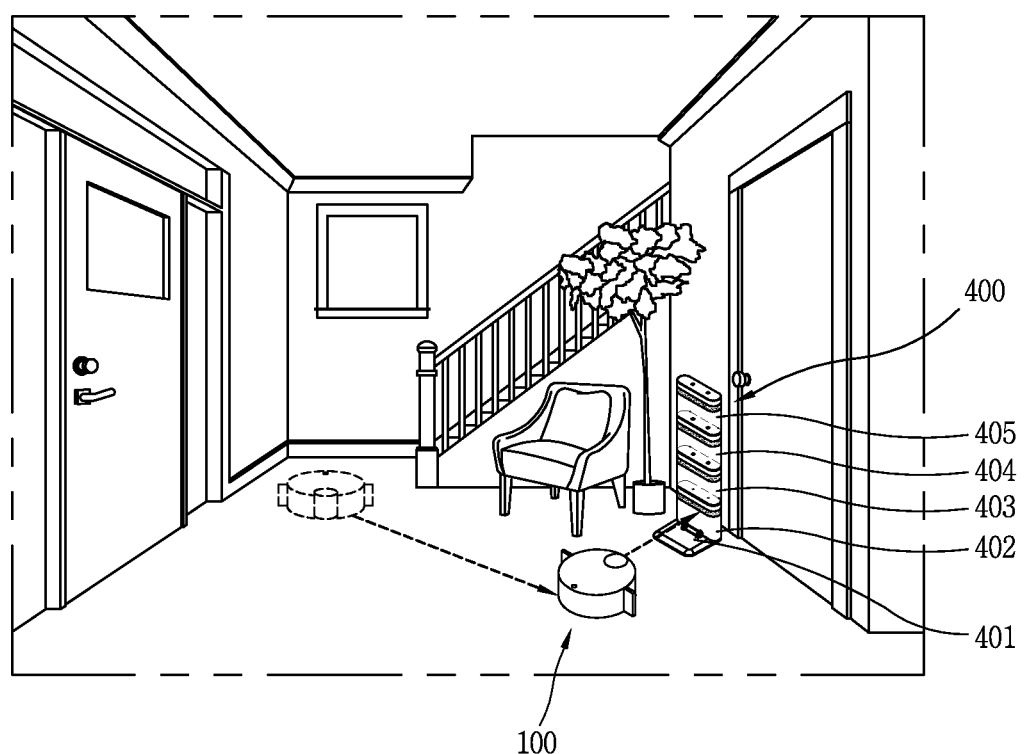
FIG. 30 is another conceptual view illustrating an operation of the robot cleaner system.

FIG. 30 is another conceptual view illustrating the operation of the robot cleaner system. A plurality of virtual walls 402, 403, 404 and 405 are stacked on the base 401 in a multilayer and simultaneously charged.

Meanwhile, the first virtual wall 402 which is stacked right above the base 401 transmits a charging inducement signal. The robot cleaner 100, which receives the charging inducement signal, is homed to the charging station 400, and then docked. When docking of the robot cleaner 100 is completed, the robot cleaner 100 may also be charged simultaneously with the virtual walls 402, 403, 404 and 405.

The robot cleaner system as described above are not limited to the above described embodiments, structures and methods, but various modifications may be made by selective combinations of part or the entirety of each embodiment. According to the above description, it is possible to charge the robot cleaner system by placing the virtual walls on the virtual wall placing part. Since the base and the virtual walls form the charging station, the robot cleaner can be charged at the charging station formed by coupling the base and the virtual walls. Accordingly, according to the present disclosure, though a separate transmitting part is not provided to the base, an automatic charging of the robot cleaner can be performed using a transmitting part provided to the virtual walls.

Further, according to the present disclosure, since a plurality of virtual walls are stacked in a multilayer on the base, it is possible to simultaneously charge the plurality of virtual walls. Further, according to the present disclosure, when the virtual wall is separated from the base, an access restriction signal is transmitted, and when the virtual is coupled to the base, a charging inducement signal is transmitted. Thus, it is possible to utilize the virtual wall in its original function and as a component of the charging station as well.

Therefore, an aspect of the detailed description is to provide a charging station capable of implementing an autonomous charging of a robot cleaner. The autonomous charging of a robot cleaner includes a three steps of homing, docking and charging. Another aspect of the detailed description is to provide a charging station having the structure capable of discharging a homing guide optical signal to an extensive area. Additionally, the present disclosure is to provide an improved structure of a robot cleaner that is advantageous to an automatic manufacturing process.

Still another aspect of the detailed description is to provide a robot cleaner system in which a virtual wall forms a charging station for charging the robot cleaner together with a base. Still another aspect of the detailed description is to provide a robot cleaner system which is configured to simultaneously charge a plurality of virtual walls on the base. Still another aspect of the detailed description is to provide a robot cleaner system which is configured to utilize the virtual wall in its original use or for use in charging of the robot cleaner according to a user's selection.

To achieve these and other aspects and in accordance with the purpose of this specification, as embodied and broadly described herein, a robot cleaner system may include a first light emitting device configured to output an optical signal for inducing a docking of the robot cleaner, a second light emitting device and a third light emitting device configured to output an optical signal for inducing a homing of the robot cleaner, and provided at the left and right of the first light emitting device, respectively, and a light emitting device fixing member configured to set position and direction of the first, second and third light emitting devices.

The light emitting device fixing member may include a first accommodation part formed to cover at least part of the first light emitting device and configured to allow the first light emitting device to be towards a front side of the charging station, a second accommodation part formed to cover at least part of the second light emitting device, and provided to be inclined to the left at a preset angle with respect to the first accommodation part such that the second light emitting device is inclined toward the left with respect to the first light emitting device, and a third accommodation part formed to cover at least part of the third light emitting device, and provided to be inclined to the right at a preset angle with respect to the first accommodation part such that the third light emitting device is inclined toward the right with respect to the first light emitting device.

The light emitting device fixing member may further include an upper member formed to cover top portions of the first, second and third light emitting devices, and a lower member formed to cover lower portions of the first, second and third light emitting devices, and the first, second and third accommodation parts may be formed by coupling the upper member with the lower member. The second accommodation part and the third accommodation part may have an angle of 40° to 50° with respect to the first accommodation part, respectively.

The charging station may further include a housing, and a printed circuit board installed within the housing and provided such that one surface hereof to be towards a front side of the charging station, a terminal pin of the first light emitting device is extended in a normal line of the printed circuit board and connected to the printed circuit board, and a terminal pin of the second light emitting device and a terminal pin of the third light emitting device are bent at a preset angle and extended in a normal line of the printed circuit board and connected to the printed circuit board.

The light emitting device fixing member may further include a protrusion part protruded to the front of the first accommodation part, a light path part formed within the protrusion part and provided to face the front of the charging station from the first light emitting device, and a plurality of linear light forming ribs protruded at both sides of the light path part to form the optical signal outputted from the first light emitting device into a linear light and provided to be spaced apart from each other. The light emitting device fixing member may further include a longitudinal slit formed at an end of the light path part to determine the shape of the linear light emitted from the light path part.

The light emitting device fixing member may include a protrusion part protruded toward the first accommodation part, and may be formed to expose the second light emitting device and the third light emitting device to left and right of the protrusion part, respectively.

The light emitting device fixing member may further include light guide parts formed, respectively, at upper and lower portions of the second and third light emitting devices exposed to left and right of the protrusion, and protruded in a direction that the second and third light emitting devices emit light.

The charging station may further include an inner housing, an absorption pattern formed within the inner housing and formed in black to absorb an optical signal outputted from the robot cleaner for docking, and reflection patterns formed at both sides of the absorption pattern, respectively, and formed in white to reflect an optical signal outputted from the robot cleaner for docking. The inner housing may include a floor and a wall, the charging station may further include two charging terminals provided to be spaced apart from each other on the floor or on a boundary between the floor and the wall, and the absorption pattern is formed between the two charging terminals.

The inner housing may include a floor and a wall, and the absorption pattern may be extended toward the front of the charging station at a boundary between the floor and the wall, and extended toward an upper end of the charging station at a boundary between the floor and the wall. The absorption pattern may be formed under the light emitting device fixing member, and provided at the same position as the light emitting device fixing member, based on left and right directions.

The charging station may further include a transparent or semitransparent housing, and the inner housing may be installed within the housing.

The inner housing may include a floor, the charging station may further include a robot cleaner charging terminal and a virtual wall charging terminal installed on the floor, the virtual wall coupled to the virtual wall charging terminal may include an absorption pattern formed in black to absorb an optical signal, and when the virtual is coupled to the virtual wall charging terminal, the absorption pattern of the charging station may form one consecutive pattern together with the absorption pattern of the virtual wall.

To achieve these and other advantages and in accordance with the purpose of this specification, as embodied and broadly described herein, a robot cleaner may include a charging station formed by coupling a base and a virtual wall. The base may include a robot cleaner charging terminal and a virtual wall charging terminal, respectively. The virtual wall is provided in plural, and charged by contacting the virtual wall charging terminal.

A plurality of virtual walls are provided to be coupled to a base to form a robot cleaner charging station, and may be formed to be stacked on the base in a multilayer so as to be simultaneously charged on the base. Each of the virtual walls may include a lower charging terminal to enable the virtual wall to be charged by contacting with the virtual wall charging terminal, and an upper charging terminal electrically connected with the lower charging terminal, and configured to enable other virtual wall to be charged by contacting with a lower charging terminal of the other virtual wall.

The lower charging terminal may be provided at a position corresponding to the virtual wall charging terminal, and the upper charging terminal may be provided at a position corresponding to a lower charging terminal of other virtual wall. The lower charging terminal and the upper charging terminal may be provided in two on each virtual wall, and the separation distance between the two lower charging terminals and the separation distance between the two upper charging terminals are identical to each other.

The virtual wall coupled to the base may be configured to transmit a charging inducement signal that induces the robot cleaner to the charging station when at least one of the plurality of virtual walls is coupled to the base, and the virtual wall separated from the base may be configured to transmit an access restriction signal that restricts access of the robot cleaner when at least one of the plurality of virtual walls is separated from the base.

The virtual wall coupled to the base may be configured to primarily transmit a homing signal that induces the robot cleaner to the charging terminal, and to secondarily transmit a docking inducement signal that allows the robot cleaner to contact the robot cleaner charging terminal when the robot cleaner approaches to the charging station.

Each of the virtual walls may include a protrusion part and a recess part so as to be coupled with each other at a fixed position, one of the protrusion part and the recess part may be formed at an upper end of each of the virtual walls, and the other of the protrusion part and the recess part may be formed at a lower end of each of the virtual walls, and when other virtual wall is coupled on any one virtual wall, a protrusion part provided at one of the two coupled virtual walls may be inserted in a recess part of the other virtual wall.

The base may include a virtual wall placing part that forms a mounting region for any one of the plurality of virtual walls, and any one of a recess part that accommodates therein the protrusion part of the virtual wall and a protrusion part configured to be inserted in the recess part such that the virtual wall placed on the virtual wall placing part may be placed at a fixed position. The base may include a virtual wall placing part that forms a placing region of any one of the plurality of virtual walls, and the virtual wall placing part may have the shape identical to an upper end of each virtual wall.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from the detailed description.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A charging system comprising:
   a charging station that includes:
   a first light emitter that outputs a first optical signal;
   a second light emitter that outputs a second optical signal;
   a third light emitter that outputs a third optical signal; and
   a light emitter housing that sets respective positions of the first, second and third light emitters and respective directions of light emitted by the first, second and third light emitters, wherein the light emitter housing includes:
   a first accommodation opening that is formed to receive the first light emitter and orients the first light emitter toward a front side of the charging station;
   a second accommodation opening that is formed to receive the second light emitter and orients the second light emitter such that the second light emitter is angled left with respect to the first light emitting device by a first prescribed angle; and
   a third accommodation opening that is formed to receive at least part of the third light emitter and orients the third light emitter such that the third light emitter is angled right with respect to the first light emitter by a second prescribed angle, and
   wherein the charging station further includes:
   a housing; and
   a printed circuit board installed within the housing and provided such that a surface thereof faces the front side of the charging station,
   wherein a terminal pin of the first light emitter extends normal to the surface of the printed circuit board and is connected to the printed circuit board, and a terminal pin of the second light emitter and a terminal pin of the third light emitter are bent at respective preset angles and include respective segments that extend normal to the surface of the printed circuit board and connect to the printed circuit board, and
   wherein an autonomous cleaner determines a location of the charging station based on detecting at least one of the first optical signal, the second optical signal, or third optical signal, and docks at the charging station based on the first optical signal.

2. The charging system of claim 1, wherein the light emitter housing further includes:
   an upper housing formed to cover top portions of the first, second and third light emitters; and
   a lower housing formed to cover lower portions of the first, second and third light emitters,
   wherein the first, second and third accommodation openings are formed by coupling the upper housing with the lower housing.

3. The charging system of claim 1, wherein each of the first prescribed angle and the second prescribed angle ranges between of 40° to 50°, respectively.

4. The robot cleaner system of claim 1, wherein the light emitter housing further includes:
   a protrusion extending at a front side of the first accommodation opening;
   a light path chamber formed within the protrusion and provided to face the front of the charging station from the first light emitter; and
   a plurality of ribs protruding from opposing sides of the light path chamber and spaced apart from each other, the ribs converting light outputted from the first light emitter into linear light.

5. The charging system of claim 4, wherein the light emitter housing further includes:
   a longitudinal slit formed at an end of the light path chamber part to shape the linear light when emitted from the light path chamber.

6. The charging system of claim 1,
   wherein the light emitter housing includes a protrusion that extends forward from the first accommodation opening, and
   wherein the light emitter housing is formed to expose the second light emitter and the third light emitter to left and right of the protrusion, respectively.

7. The charging system of claim 6, wherein the light emitter housing further includes light guides formed above and below, respectively, the second and third light emitters that are exposed to left and right of the protrusion and protruded in a respective directions that the second and third light emitters emit light.

8. The charging system of claim 1, wherein the charging station further includes:
   an inner housing;
   an absorption pattern that is formed on the inner housing and absorbs an optical signal outputted from the autonomous cleaner; and
   reflection patterns that are formed at left and right sides of the absorption pattern, respectively, and reflect the optical signal outputted from the autonomous cleaner.

9. The robot cleaner system of claim 8,
   wherein the inner housing includes a horizontal surface and a vertical surface,
   wherein the charging station further includes two charging terminals provided to be spaced apart from each other on the horizontal surface or on a boundary between the horizontal surface and the vertical surface, and
   wherein the absorption pattern is formed between the two charging terminals.

10. The charging system of claim 8,
    wherein the inner housing includes a horizontal surface and a vertical surface, and
    wherein the absorption pattern extends forward toward the front of the charging station from a boundary between the horizontal surface and the vertical surface, and extends upward toward an upper end of the charging station from the boundary between the horizontal surface and the vertical surface.

11. The charging system of claim 8, wherein the absorption pattern is formed below the light emitter housing, and is vertically aligned with the light emitter housing.

12. The charging system of claim 8,
    wherein the charging station further includes a transparent or semitransparent housing, and
    wherein a portion of the inner housing is installed within the housing.

13. The charging system of claim 8,
    wherein the inner housing includes a horizontal surface;
    wherein the horizontal surface includes a first charging terminal to charge the autonomous cleaner when docked in the charging station and a second charging terminal;

wherein a virtual wall module coupled to the second charging terminal also includes the absorption pattern to absorb the optical signal from the autonomous cleaner, and wherein when the virtual wall module is coupled to the second charging terminal, the absorption pattern extends continuously on the inner housing and an outside surface of the virtual wall module.

14. The charging system of claim 1, further comprising:

a base that includes a first charging terminal that charges the autonomous cleaner when docked in the charging station and a second charging terminal; and a plurality of virtual wall modules configured to be selectively coupled to the base to form the charging station and to be charged via the second charging terminal, wherein each of the virtual wall modules includes:
  a lower charging terminal configured to charge the virtual wall module; and
  an upper charging terminal electrically connected with the lower terminal and configured to enable another one of the virtual wall modules to be charged by contacting a lower charging terminal of the other virtual wall module, and wherein the plurality of virtual wall modules are formed to be stacked over the base so as to be simultaneously charged through the base.

15. The charging system of claim 14, wherein the lower charging terminal is provided at a position corresponding to the second charging terminal of the base, and wherein the upper charging terminal is provided at a position corresponding to the lower charging terminal of the other virtual wall module.

16. The charging system of claim 14, wherein each of the virtual wall modules includes two of the lower charging terminals and two the upper charging terminals, and wherein a separation distance between the two lower charging terminals corresponds to a separation distance between the two upper charging terminals.

17. The charging system of claim 14, wherein one of the virtual wall modules includes a transmitter, wherein when the one of the plurality of virtual wall modules is not coupled to the base, the transmitter is configured to output an access restriction signal that instructs the autonomous cleaner to not move toward the one of the plurality of virtual walls modules, and wherein when the one of the plurality of virtual wall modules is coupled to the base, the transmitter is configured to transmit a homing signal that induces the autonomous cleaner to move toward the charging terminal, and to transmit a docking inducement signal that instructs the autonomous cleaner to dock at the charging terminal to contact the second charging terminal when the autonomous cleaner moves within a prescribed distance of the charging station.

18. The charging system of claim 14, wherein each of the virtual wall modules includes a protrusions and a recess so as to be coupled with each other at a fixed position, wherein one of the protrusions or the recess is formed at an upper end of each of the virtual wall modules, wherein another one the protrusion or the recess is formed at a lower end of each of the virtual wall modules, wherein when two of virtual wall modules are coupled together, the protrusion provided at one of the two virtual wall modules is inserted in the recess provided of another of the two virtual wall modules, and wherein the base includes:
  a virtual wall module accommodation surface to receive one of the plurality of virtual wall modules; and
  the virtual wall module accommodation surface is configured to be coupled to one of the recess or the protrusion for a bottom one of the virtual wall modules.

19. The charging system of claim 14, wherein the base includes a virtual wall module accommodation surface to receive one of the plurality of virtual wall modules, and wherein a shape of the virtual wall module accommodation surface corresponds to a shape of an upper end of one of the virtual wall modules.

* * * * *